United States Patent
Lakshmanan et al.

(10) Patent No.: US 12,075,352 B2
(45) Date of Patent: Aug. 27, 2024

(54) POWER MANAGEMENT FOR SIGNAL SCANNING

(71) Applicant: Apple Inc., Cupertino, CA (US)

(72) Inventors: Sriram Lakshmanan, Fremont, CA (US); Tushar Ramanlal Shah, Cupertino, CA (US); Udaykumar R. Raval, Cupertino, CA (US); Bernd Willi Adler, San Jose, CA (US); Dongwoon Hahn, San Jose, CA (US); Shehla S. Rana, San Jose, CA (US); Yang Yu, Redwood City, CA (US); Rajneesh Kumar, Los Gatos, CA (US); Veerendra Boodannavar, Cupertino, CA (US); Yann Ly-Gagnon, San Francisco, CA (US); Duy N. Phan, San Jose, CA (US); Karan Sawhney, San Jose, CA (US); Rohit Sharma, San Jose, CA (US); Sarin S. Mehta, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 420 days.

(21) Appl. No.: 17/373,488

(22) Filed: Jul. 12, 2021

(65) Prior Publication Data

US 2022/0078704 A1 Mar. 10, 2022

Related U.S. Application Data

(60) Provisional application No. 63/074,855, filed on Sep. 4, 2020.

(51) Int. Cl.
*H04W 52/02* (2009.01)
*H04W 8/00* (2009.01)
*H04W 24/10* (2009.01)

(52) U.S. Cl.
CPC ....... *H04W 52/0216* (2013.01); *H04W 8/005* (2013.01); *H04W 24/10* (2013.01); *H04W 52/0225* (2013.01)

(58) Field of Classification Search
CPC . H04W 52/0216; H04W 8/005; H04W 24/10; H04W 52/0225; H04W 48/16;
(Continued)

(56) References Cited

U.S. PATENT DOCUMENTS

| 6,985,755 B2 | 1/2006 | Cadieux et al. |
| 7,257,380 B2 | 8/2007 | Darabi et al. |

(Continued)

FOREIGN PATENT DOCUMENTS

| CN | 102830634 A | 12/2012 |
| CN | 103236868 A | 8/2013 |

(Continued)

OTHER PUBLICATIONS

Partial Search Report for PCT Application No. PCT/US2021/046758 dated Dec. 9, 2021; 17 pgs.

*Primary Examiner* — Walli Z Butt
(74) *Attorney, Agent, or Firm* — FLETCHER YODER PC

(57) ABSTRACT

Embodiments disclosed herein relate to reducing power consumption of an electronic device scanning for wireless communication signals while maintaining or even improving an efficiency of the scanning operations. To do so, the electronic device may include more than one scan core, such as a main core and a receiving core. The receiving core may have limited functionality compared to the main core. For example, the receiving core may only receive wireless signals (including scanning for wireless signals). That is, the receiving core may not support certain operations that consume relative high power that are supported by the main core, such as transmission of signals. In this way, operation (Continued)

of the receiving core, either in place of or in addition to the main core, may reduce power consumption of the electronic device by avoiding high power consuming operations, such as data transmission, while scanning for various signals.

20 Claims, 12 Drawing Sheets

(58) Field of Classification Search
CPC ............ H04W 84/12; H04W 52/0254; H04W 52/0258; H04W 52/028; Y02D 10/00; Y02D 30/70; G06F 1/3209; G06F 1/3278; G06F 1/3287
See application file for complete search history.

(56) References Cited

U.S. PATENT DOCUMENTS

| | | | |
|---|---|---|---|
| 7,403,774 | B2 | 7/2008 | Chandra et al. |
| 8,615,270 | B2 | 12/2013 | Ibrahim et al. |
| 9,207,748 | B2 | 12/2015 | Paljug |
| 9,907,015 | B2 | 2/2018 | Hegde et al. |
| 10,979,106 | B2 | 4/2021 | Liu et al. |
| 2004/0162023 | A1 | 8/2004 | Cho |
| 2004/0259589 | A1 | 12/2004 | Bahl et al. |
| 2005/0208900 | A1 | 9/2005 | Karacaoglu |
| 2005/0243954 | A1 | 11/2005 | Li |
| 2006/0128308 | A1 | 6/2006 | Michael et al. |
| 2007/0202807 | A1 | 8/2007 | Kim |
| 2008/0045152 | A1 | 2/2008 | Boes |
| 2008/0045162 | A1 | 2/2008 | Rofougaran et al. |
| 2010/0316027 | A1 | 12/2010 | Rick et al. |
| 2011/0116490 | A1 | 5/2011 | Wilhelmsson et al. |
| 2011/0171922 | A1 | 7/2011 | Kim et al. |
| 2011/0267966 | A1 | 11/2011 | Gao et al. |
| 2012/0092714 | A1 | 4/2012 | Suzuki |
| 2013/0148636 | A1 | 6/2013 | Lum et al. |
| 2013/0259016 | A1 | 10/2013 | Xhafa et al. |
| 2013/0265945 | A1 | 10/2013 | He et al. |
| 2014/0016498 | A1 | 1/2014 | Sharma |
| 2014/0056288 | A1 | 2/2014 | Wyper et al. |
| 2014/0162023 | A1 | 6/2014 | Greer, Jr. et al. |
| 2014/0269650 | A1 | 9/2014 | Sahota |
| 2014/0293912 | A1 | 10/2014 | Chao et al. |
| 2015/0031288 | A1 | 1/2015 | Tubbesing et al. |
| 2015/0133185 | A1 | 5/2015 | Chen et al. |
| 2016/0157193 | A1 | 6/2016 | Qi et al. |
| 2016/0227354 | A1 | 8/2016 | Zhao et al. |
| 2016/0381706 | A1 | 12/2016 | Huang et al. |
| 2017/0332327 | A1* | 11/2017 | Fang ................... H04L 5/0007 |
| 2018/0069683 | A1 | 3/2018 | Huang et al. |
| 2019/0223101 | A1* | 7/2019 | Li ................... H04W 52/0229 |
| 2020/0314751 | A1* | 10/2020 | Liu ................... H04W 52/0229 |
| 2020/0344690 | A1* | 10/2020 | Kim ................. H04W 52/0216 |
| 2021/0185597 | A1* | 6/2021 | Chitrakar .......... H04W 52/0241 |

FOREIGN PATENT DOCUMENTS

| | | |
|---|---|---|
| CN | 105376040 A | 3/2016 |
| EP | 3637867 A1 | 4/2020 |

* cited by examiner

POWER MANAGEMENT FOR SIGNAL SCANNING

CROSS-REFERENCE TO RELATED APPLICATIONS

This application claims the benefit of U.S. Provisional Application No. 63/074,855, filed Sep. 4, 2020, and entitled "POWER MANAGEMENT FOR SIGNAL SCANNING," which is incorporated herein by reference in its entirety for all purposes.

BACKGROUND

The present disclosure relates generally to electronic devices, and more particularly, to electronic devices that transmit and receive radio frequency signals for wireless communication.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Today, more data than ever is communicated using various wireless communication technologies. For example, many electronic devices communicate using wireless local area networks (WLANs) (such as those based on a communication protocol that is compatible with the IEEE 802.11 standard (referred to as "Wi-Fi")), Bluetooth® (BT), and the like. However, a radio in an electronic device that communicates wirelessly may consume a significant amount of power.

In some cases, electronic devices consume significant power to communicate wirelessly because the devices are designed to be compatible with many generations of communication standards. For example, a WLAN radio may be designed to cover standards such as 802.11n, 802.11ac, 802.11ax, and 802.11ax (with new Unlicensed National Information Infrastructure (UNIT) 5-8 band spectrum support). Similarly, a BT radio may be designed to cover standards like BT 1.0 (BT classic basic data rate), BT 2.1 (BT classic enhanced data rate), BT 4.0 (BT low energy), BT 5.0 (BT low energy, long range), BT 5.2 (BT low energy, isochronous channels).

New standards for these technologies impose additional requirements and complex new modulation schemes for transmission and reception of signals. For example, each WLAN standard may require support for a different modulation scheme, such as Orthogonal Frequency Division Multiplexing (OFDM) and Quadrature Amplitude modulation (QAM), OFDM modulation with 64-QAM constellation, OFDM modulation with 256-QAM constellation, OFDM modulation with 1024-QAM constellation. Further, some new standards may utilize frequency bands that were not previously used. For example, each WLAN standard may require support for a different frequency band, such as 2.4 gigahertz (GHz) ISM, 5 GHz UNII.

Bandwidth used for WLAN transmission and reception has also increased as new standards are introduced. For example, 802.11a and 802.11g standards used a maximum of 20 megahertz (MHz) signal bandwidth, while 802.11ac/ax increased the maximum bandwidth to 160 MHz. Future planned WLAN standards are projected to further increase the bandwidth to 320 MHz. The increase in maximum bandwidth and support for additional frequency spectrums may further increase the power consumption of these devices.

As wireless communication via portable electronic devices increases and becomes more common, the need to increase battery life for the device while maintaining compatibility with the various standards becomes more desirable and increasingly more important. In particular, conventional techniques to scan for wireless signals may utilize one or more wireless communication cores, where each core may both receive and transmit wireless signals. That is, to scan a signal (e.g., Wi-Fi, BT, etc.), a core is activated. However, while scanning for the signal, certain functionality of the core (such as transmission functionality) may be activated, even though that functionality may not be used (e.g., there is no signal to be transmitted). Thus, a conventional core may unnecessarily consume battery power due to unused functionality.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

As discussed above, there is a desire to prolong battery life of an electronic device while maintaining wireless scanning and communication functionality of the device. Embodiments disclosed herein provide various apparatus and techniques to reduce power consumption of the electronic device and extend battery life, while maintaining efficiency of scanning operations. To do so, the embodiments disclosed herein include electronic devices with a main core and a receiving core. The main core may both receive and transmit wireless signals. The main core may also support various other functions, such as device-to-device communications, geofencing, wireless audio and video streaming, fitness tracking, and the like. However, to support these functionalities, the main core consumes a significant amount of power. That is, the main core may be continuously receiving and transmitting data even if the device is not actively being used by a user. Thus, to reduce power consumption of the main core, the main core may be deactivated (e.g., turned off) for a period of time. In some embodiments, the main core may be deactivated while not in use. In other embodiments, the main core may be deactivated and reactivated at a time interval. While the main core is deactivated, the low-power-consuming receiving core is activated to maintain at least some wireless scanning and communication functionality.

To reduce power consumption of the electronic device, the receiving core may only receive wireless signals (including scanning for wireless signals). That is, the receiving core may not support certain operations that consume relative high power that are supported by the main core, such as transmission of signals. In this way, operating the receiving core, either in place of or in addition to the main core, may reduce power consumption of the electronic device by avoiding operations that consume high power while scanning for various signals.

In some embodiments, the receiving core may operate concurrently with the main core. For example, the receiving core and the main core may scan for different signals on a different channel and/or frequency. In some embodiments, the main core and the receiving core may operate at different times. For example, the main core may scan for a signal on a first channel while the receiving core is idle. The receiving core may then scan for a signal while the main core is idle. In some embodiments, whether the main core and the receiving core operate concurrently or time separated may be determined based on metrics perceived by a user of a respective electronic device. In other embodiments, concurrent or time separated operation of the main core and the receiving core may be dynamically determined based on a particular operation (e.g., scan) being performed.

Depending on the functionality needed to perform a particular operation or process, a host processor of the electronic device may alternate between activating the main core and the receiving core. In some embodiments, the main core may be deactivated while the receiving core is activated. Deactivating the main core may further reduce power consumed by the electronic device. That is, the host processor may first determine whether a particular function is supported by the receiving core. If so, the host processor may activate the receiving core and/or deactivate the main core.

In some embodiments, the receiving core may be used to scan for and identify signals over various wireless communication protocols and standards, such as Wi-Fi and BT. For example, the receiving core may be used to scan for other Wi-Fi enabled and/or BT-enabled devices that may be wirelessly connected to the electronic device. The other devices may include, for example, a wireless router and associated network, a smartphone, a laptop computer, a desktop computer, a tablet computer, wireless headphones, wearable devices, network access points, televisions, wireless audio devices, wireless printers, and the like.

The signals received by the low-power receiving core may be used for various operations such as detecting and identifying various devices and/or networks in proximity to the electronic device, determining if and when to activate the main core, determining a degree of congestion on various frequency bands used by the main core, determining a proximity to other devices for social distancing and/or contact tracing, and the like.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below.

DETAILED DESCRIPTION OF SPECIFIC EMBODIMENTS

Figure 1:
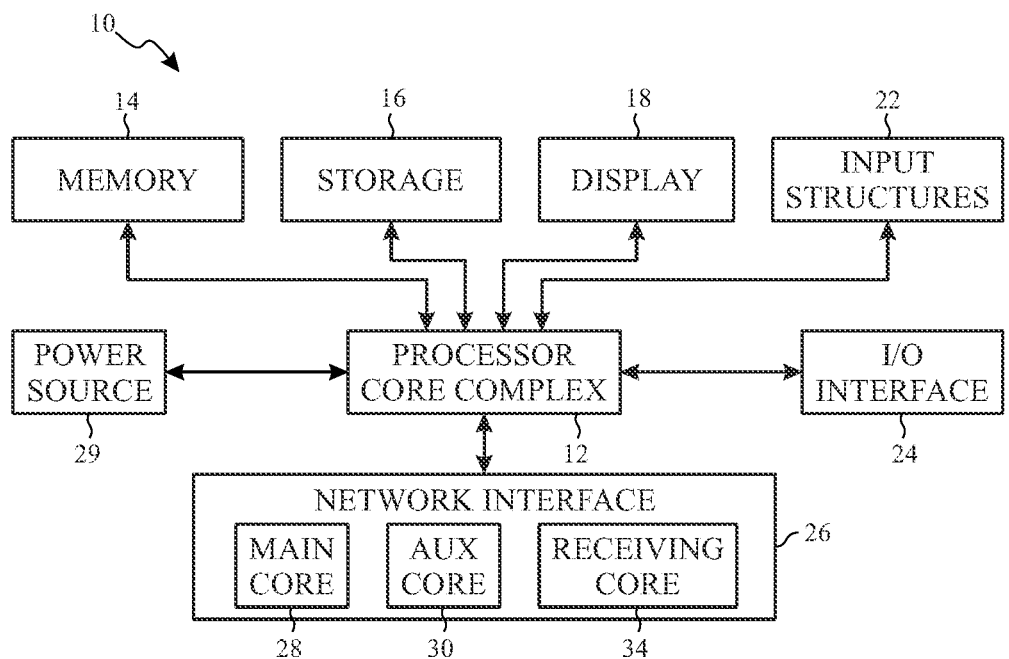
FIG. 1 is a block diagram of an electronic device, according to an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Use of the term "approximately," "near," and/or "about" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on).

As used herein, "sleep mode" may refer to a low power mode of an electronic device. Sleep mode may significantly reduce an amount of power consumed by the electronic device. The device may be placed into sleep mode based on an input received through a user interface displayed on the device or based on inactivity of the device. For example, a user of the device may manually activate sleep mode of the device or the device may automatically enter sleep mode after a particular period of time passes, such as between about approximately 1 minute and 5 minutes, without receiving any inputs from the user or sensors of the device.

As used herein, "social distancing" may refer to physical distancing of users (e.g., of electronic devices), which may be evidenced by the physical distance of the electronic devices themselves. As used herein, "contact tracing" may refer to a process of identifying places and/or people that have been in close proximity to a user, which may be evidenced by electronic devices of the people and the user. Social distancing and contact tracing may be used by, for example, health officials, to determine places or people that have come in contact (or have been in close proximity) to the user, as evidenced by the electronic device of the user. In particular, social distancing and contact tracing may be used to identify people (through electronic devices associated with those people) that may have been in proximity to the user (through the electronic device of the user) when it is discovered that the user is infected with, for example, a virus or infectious disease.

With the foregoing in mind, there are many suitable communication devices that may include and use the receiving core described herein. Turning first to FIG. 1, an electronic device 10 according to an embodiment of the present disclosure may include, among other things, a processor core complex 12 including one or more processor(s), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in electronic device 10.

Figure 2:
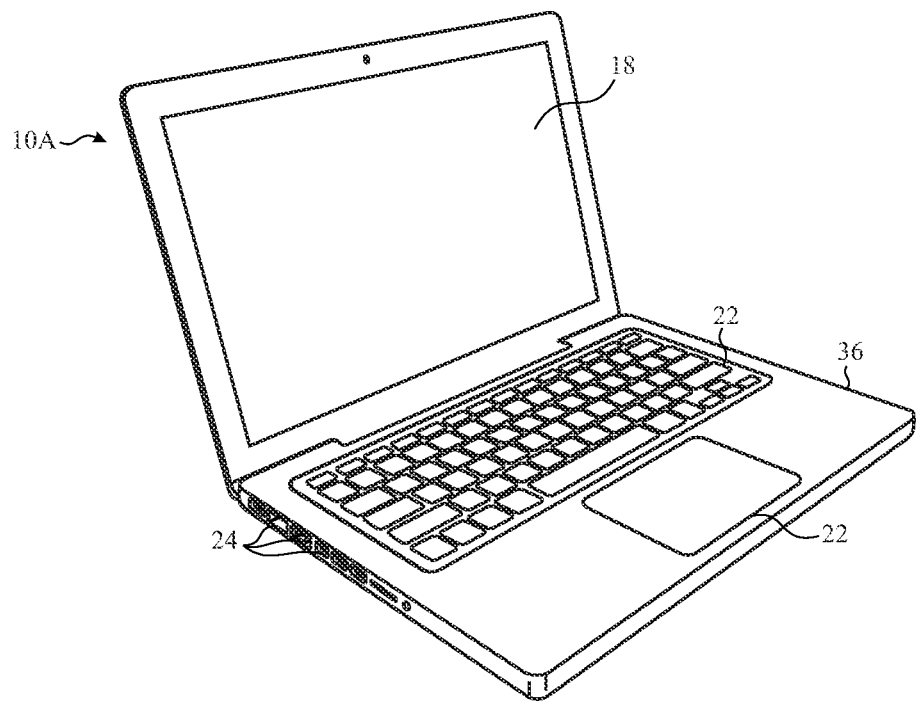
FIG. 2 is a perspective view of a notebook computer representing an embodiment of the electronic device of FIG. 1.
Figure 4:
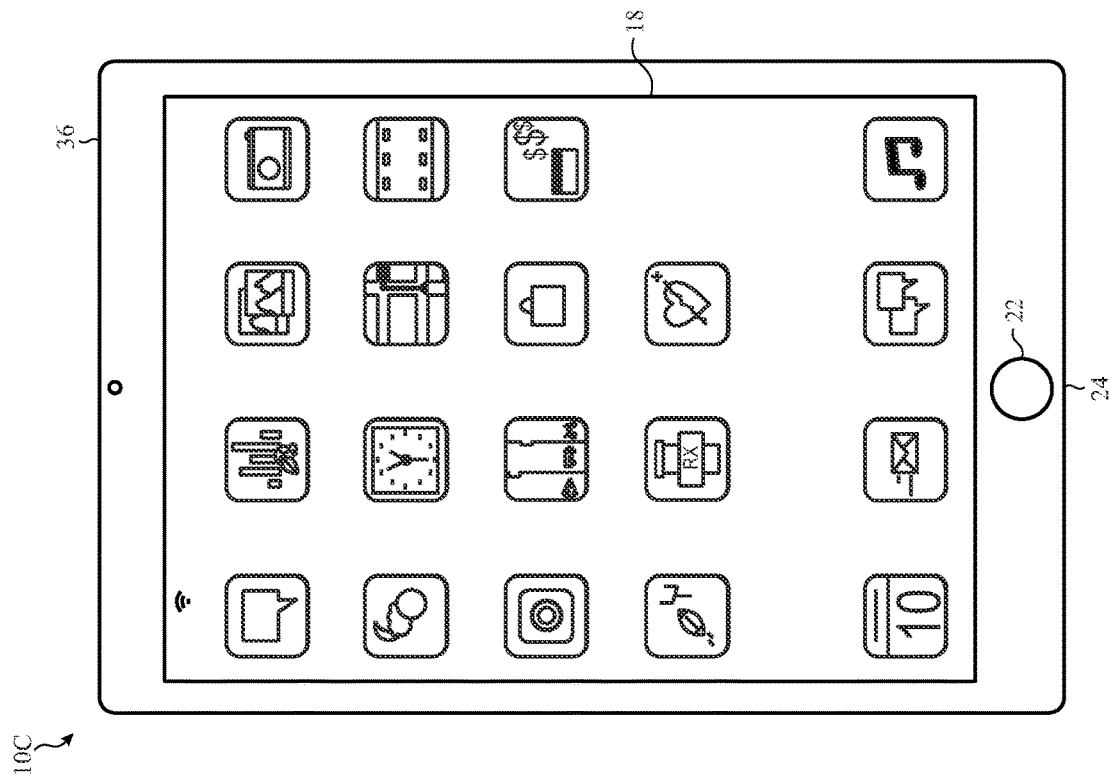
FIG. 4 is a front view of another handheld device representing another embodiment of the electronic device of FIG. 1.
Figure 3:
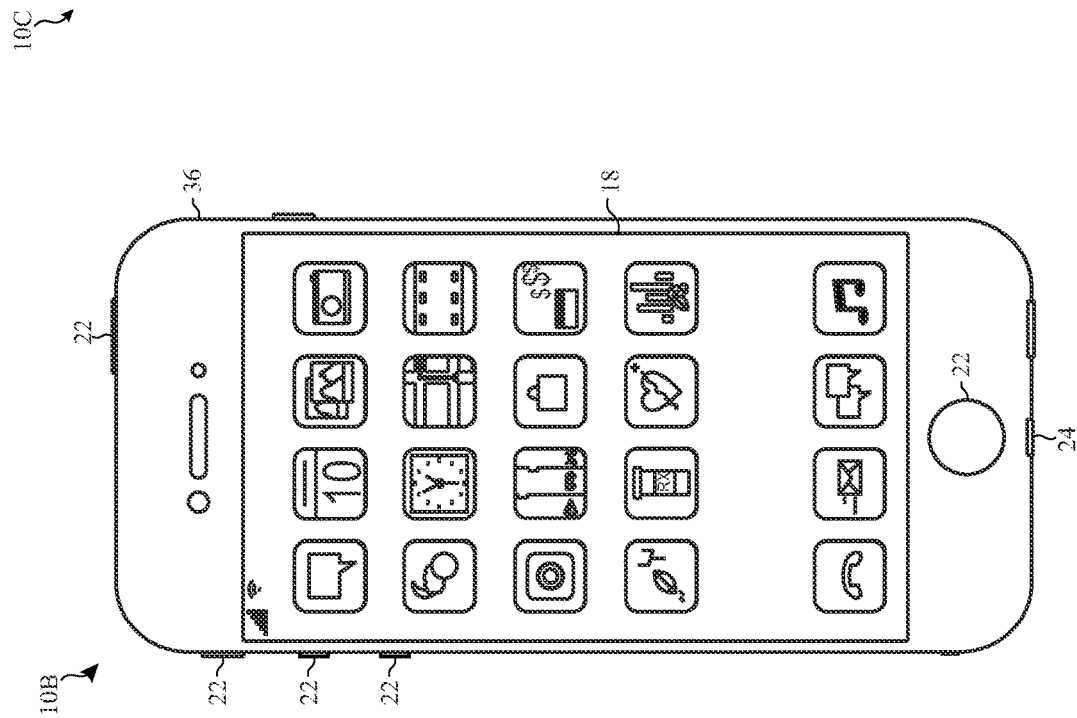
FIG. 3 is a front view of a handheld device representing another embodiment of the electronic device of FIG. 1.
Figure 5:
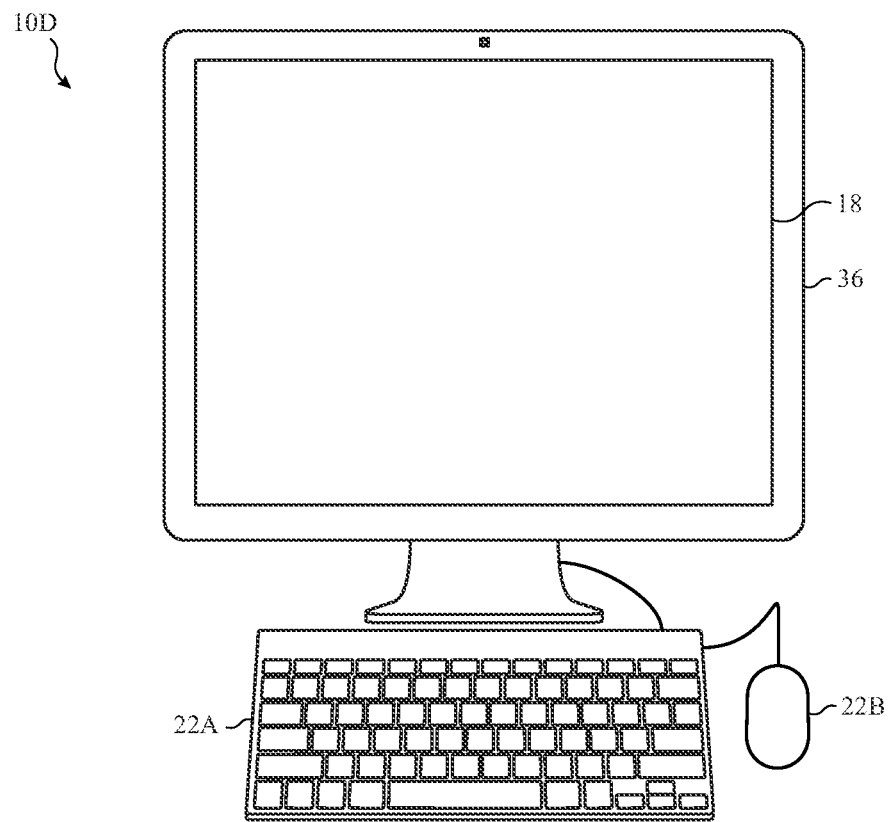
FIG. 5 is a front view of a desktop computer representing another embodiment of the electronic device of FIG. 1.
Figure 6:
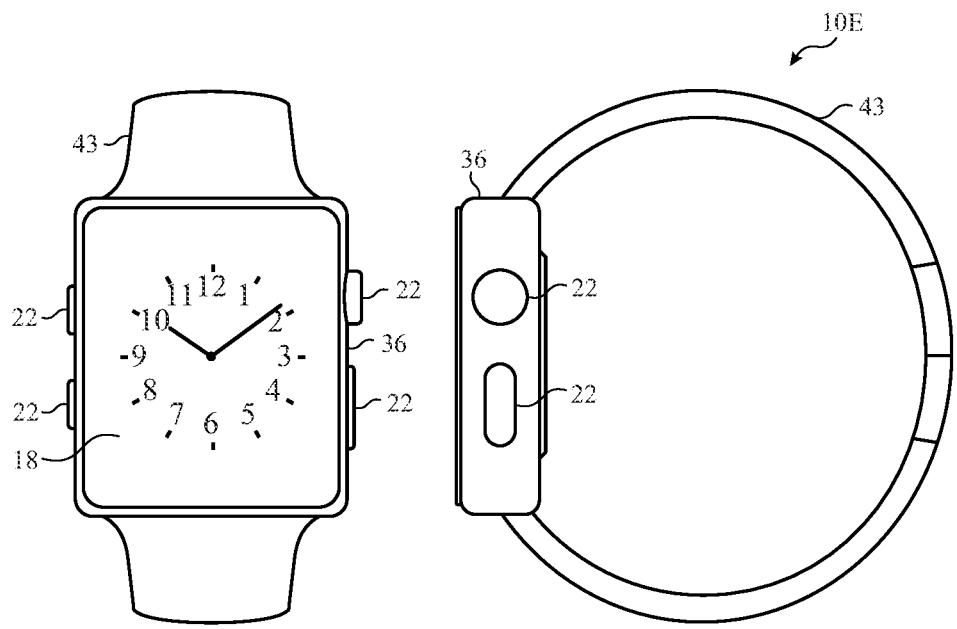
FIG. 6 is a perspective view of a wearable electronic device representing another embodiment of the electronic device of FIG. 1.

By way of example, the electronic device 10 may represent a block diagram of the notebook computer depicted in FIG. 2, the handheld device depicted in FIG. 3, the handheld device depicted in FIG. 4, the desktop computer depicted in FIG. 5, the wearable electronic device depicted in FIG. 6, or similar devices. It should be noted that the processor(s) 12 and other related items in FIG. 1 may be generally referred to herein as "data processing circuitry." Such data processing circuitry may be embodied wholly or in part as software, software, hardware, or any combination thereof. Furthermore, the processor(s) 12 and other related items in FIG. 1 may be a single contained processing module or may be incorporated wholly or partially within any of the other elements within the electronic device 10.

In the electronic device 10 of FIG. 1, the processor(s) 12 may be operably coupled with a memory 14 and a nonvolatile storage 16 to perform various algorithms. Such programs or instructions executed by the processor(s) 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor(s) 12 to enable the electronic device 10 to provide various functionalities.

In certain embodiments, the display 18 may be a liquid crystal display (LCD), which may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more light-emitting diode (LED) displays, organic light-emitting diode (OLED) displays, active-matrix organic light-emitting diode (AMOLED) displays, or some combination of these and/or other display technologies.

The input structures 22 of the electronic device 10 may enable a user to interact with the electronic device 10 (e.g., pressing a button to increase or decrease a volume level).

The I/O interface 24 may enable electronic device 10 to interface with various other electronic devices, as may the network interface 26. The network interface 26 may include, for example, one or more interfaces for a personal area network (PAN), such as a BLUETOOTH® network, for a local area network (LAN) or wireless local area network (WLAN), such as an 802.11x WI-FI® network, and/or for a wide area network (WAN), such as a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network. In particular, the network interface 26 may include, for example, one or more interfaces for using a Release-15 cellular communication standard of the 5G specifications that include the millimeter wave (mmWave) frequency range (e.g., 24.25-300 gigahertz (GHz)). The network interface 26 of the electronic device 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

As illustrated, the network interface 26 may include a main core 28, an auxiliary core 30, and a receiving core 34. In some embodiments, all or portions of the main core 28, the auxiliary core 30, and the receiving core 34 may be disposed within the processor core complex 12. In some embodiments, the processor core complex 12 may determine which of the main core 28, the auxiliary core 30, and the receiving core 34 is to perform a particular scanning operation and when to activate and/or deactivate the main core 28, the auxiliary core 30, and the receiving core 34. The receiving core 34 may be referred to herein as a "scanning core" or a "low power core."

The main core 28 may include a transceiver and/or support transmission and receipt of various wireless signals. The auxiliary core 30 may also include a transceiver and/or support transmission and receipt of various wireless signals, though in some cases, the electronic device 10 may not include the auxiliary core 30. In some embodiments, the auxiliary core 30 may support the same or similar operations and/or functionality as the main core 28. In other embodiments, the auxiliary core 30 may support different operations and/or functionality than the main core 28. For example, the main core 28 may be used for sending and receiving wireless signals using one or more wireless communication protocols (e.g., Wi-Fi), while the auxiliary core 30 may be used for sending and receiving wireless signals using different wireless communication protocols (e.g., BT).

In some embodiments, the main core 28 may transmit and receive signals on a first channel (e.g., over one or more channels in the 5 GHz range) and/or frequency (e.g., in the 5 GHz frequency range) and the auxiliary core 30 may transmit and receive signals on a second channel (e.g., over one or more channels in the 2.4 GHz range) and/or frequency (e.g., in the 2.4 GHz frequency range). For example, the main core 28 may support wireless communication using a first wireless communication standard, such as 802.11a/n/ac/ax, while the auxiliary core 30 may support wireless communication using a second wireless communication standard, such as 802.11a/b/g/n/ac/ax. While the main core 28 and the auxiliary core 30 may support some of the same wireless communication standards, the main core 28 and the auxiliary core 30 may also support different wireless communication standards.

The receiving core 34 may receive wireless signals but may not support transmission of wireless signals. That is, the receiving core 34 may be used to receive and monitor wireless signals and communication channels, but not to transmit signals and/or data. Thus, because the receiving core 34 supports less functionality (receiving only) compared to the main core 28 and the auxiliary core 30, the receiving core 34 consumes significantly less power. In some embodiments, the functionality of the receiving core 34 may overlap with the functionality of the main core 28 and/or the auxiliary core 30. For example, the receiving core 34 may be configured to receive signals that the main core 28 and/or the auxiliary core 30 are configured to receive. That is, in some embodiments, the receiving core 34 may be configured to receive the same signal as the main core 28 and/or the auxiliary core 30 at the same time. Indeed, the receiving core 34 may receive signals in multiple frequency bands (e.g., dual bands, such as in the 5 GHz frequency range as well as the 2.4 GHz frequency range). In some embodiments, the receiving core may receive signals having a frequency of approximately 2.4-2.4835 GHz. In some embodiments, the receiving core 34 may be dedicated for a particular wireless channel and/or frequency. In other embodiments, the receiving core 34 may be shared across multiple channels and/or frequencies.

In some embodiments, the main core 28 may use approximately 60-70 milliwatts (mW) per scan. In other embodiments, the main core may use approximately 25-65 mW per scan, such as approximately 27-52 mW or approximately 27-60 mW. In some embodiments, the receiving core 34 may use approximately 40-50 mW per scan. In other embodiments, the receiving core may use approximately 5-50 mW, such as approximately 8-33 mW or approximately 8-40 mW.

In this manner, the processor 12 may offload tasks from the main core 28 and/or the auxiliary core 30 to the lower-power-consuming receiving core 34 to save power. For example, the receiving core 34 may scan for or receive a wireless signal while the main core 28 is deactivated (as opposed to the main core 28 scanning for or receiving the wireless signal—thus reducing power consumption). Upon the receiving core 34 receiving the signal, the main core 28 may then be activated to receive and process the signal and/or generate and transmit a response to the received signal. Additionally or alternatively, communication performance may be increased, while maintaining or even reducing power consumption. For example, scans for wireless signals (e.g., Wi-Fi or BT beacon signals) may be performed more frequently by the receiving core 34 instead of the main core 28 and/or the auxiliary core 30, thereby enabling a greater likelihood of detection of a Wi-Fi access point or a BT pairing device. While this may cause the receiving core 34 to increase power consumption, the example architecture 50 may nevertheless maintain or even reduce overall power consumption when compared to the main core 28 and/or the auxiliary core 30 performing such scans. In some embodiments, these additional scans could be performed on different channels (e.g., to determine noise and/or availability on those channels). As another example, a scanning range of the receiving core 34 may be boosted or increased (e.g., by using a low noise amplifier to amplify weaker signals received at greater range), again enabling a greater likelihood of detection of a Wi-Fi access point or a BT pairing device, while maintaining or even reducing overall power consumption when compared to the main core 28 and/or the auxiliary core 30 performing such scans.

In some embodiments, the electronic device 10 communicates over the aforementioned wireless networks (e.g., WI-FI®, WIMAX®, mobile WIMAX®, 4G, LTE®, 5G, and so forth) using the main core 28, the auxiliary core 30, and the receiving core 34. The main core 28 and the auxiliary core 30 may each include circuitry useful in wirelessly transmitting and receiving signals (e.g., data signals, wireless data signals, wireless carrier signals, RF signals), such as a transmitter and/or a receiver. Further, the receiving core 34 may include circuitry for wirelessly receiving the signals, such as a receiver. Indeed, in some embodiments, the main core 28 and the auxiliary core 30 may include a transmitter and a receiver combined into a single unit, or, in other embodiments, the main core 28 and the auxiliary core 30 may include a transmitter separate from a receiver. The main core 28 and the auxiliary core 30 may transmit and receive RF signals to support voice and/or data communication in wireless applications such as, for example, PAN networks (e.g., BLUETOOTH®), WLAN networks (e.g., 802.11x WI-FI®), WAN networks (e.g., 3G, 4G, 5G, NR, and LTE® and LTE-LAA cellular networks), WIMAX® networks, mobile WIMAX® networks, ADSL and VDSL networks, DVB-T® and DVB-H® networks, UWB networks, and so forth. The power source 29 of the electronic device 10 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may be generally portable (such as laptop, notebook, and tablet computers), or generally used in one place (such as conventional desktop computers, workstations, and/or servers). In certain embodiments, the electronic device 10 in the form of a computer may be a model of a MacBook®, MacBook® Pro, MacBook Air®, iMac®, Mac® mini, or Mac Pro® available from Apple Inc. of Cupertino, California By way of example, the electronic device 10, taking the form of a notebook computer 10A, is illustrated in FIG. 2 in accordance with one embodiment of the present disclosure. The depicted notebook computer 10A may include a housing or enclosure 36, a display 18, input structures 22, and ports of an I/O interface 24. In one embodiment, the input structures 22 (such as a keyboard and/or touchpad) may be used to interact with the computer 10A, such as to start, control, or operate a graphical user interface (GUI) and/or applications running on computer 10A. For example, a keyboard and/or touchpad may allow a user to navigate a user interface and/or application interface displayed on display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPod® or iPhone® available from Apple Inc. of Cupertino, California. The handheld device 10B may include an enclosure 36 to protect interior components from physical damage and/or to shield them from electromagnetic interference. The enclosure 36 may surround the display 18. The I/O interfaces 24 may open through the enclosure 36 and may include, for example, an I/O port for a hardwired connection for charging and/or content manipulation using a standard connector and protocol, such as the Lightning connector provided by Apple Inc. of Cupertino, California, a universal serial bus (USB), or other similar connector and protocol.

The input structures 22, in combination with the display 18, may allow a user to control the handheld device 10B. For example, the input structures 22 may activate or deactivate the handheld device 10B, navigate the user interface to a home screen, a user-configurable application screen, and/or activate a voice-recognition feature of the handheld device 10B. Other input structures 22 may provide volume control, or may toggle between vibrate and ring modes. The input structures 22 may also include a microphone that may obtain a user's voice for various voice-related features, and a speaker that may enable audio playback and/or certain phone capabilities. The input structures 22 may also include a headphone input that may provide a connection to external speakers and/or headphones.

FIG. 4 depicts a front view of another handheld device 10C, which represents another embodiment of the electronic device 10. The handheld device 10C may represent, for example, a tablet computer, or one of various portable computing devices. By way of example, the handheld device 10C may be a tablet-sized embodiment of the electronic device 10, which may be, for example, a model of an iPad® available from Apple Inc. of Cupertino, California.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook®, or another similar device by Apple Inc. of Cupertino, California. It should be noted that the computer 10D may also represent a personal computer (PC) by another manufacturer. A similar enclosure 36 may be provided to protect and enclose internal components of the computer 10D, such as the display 18. In certain embodiments, a user of the computer 10D may interact with the computer 10D using various peripheral input structures 22, such as the keyboard 22A or mouse 22B (e.g., input structures 22), which may connect to the computer 10D.

Similarly, FIG. 6 depicts a wearable electronic device 10E representing another embodiment of the electronic device 10 of FIG. 1 that may operate using the techniques described herein. By way of example, the wearable electronic device 10E, which may include a wristband 43, may be an Apple Watch® by Apple Inc. of Cupertino, California. However, in other embodiments, the wearable electronic device 10E may include any wearable electronic device such as, for example, a wearable exercise monitoring device (e.g., pedometer, accelerometer, heart rate monitor), or other device by another manufacturer. The display 18 of the wearable electronic device 10E may include a touch screen display 18 (e.g., LCD, LED display, OLED display, active-matrix organic light emitting diode (AMOLED) display, and so forth), as well as input structures 22, which may allow users to interact with a user interface of the wearable electronic device 10E.

Figure 7:
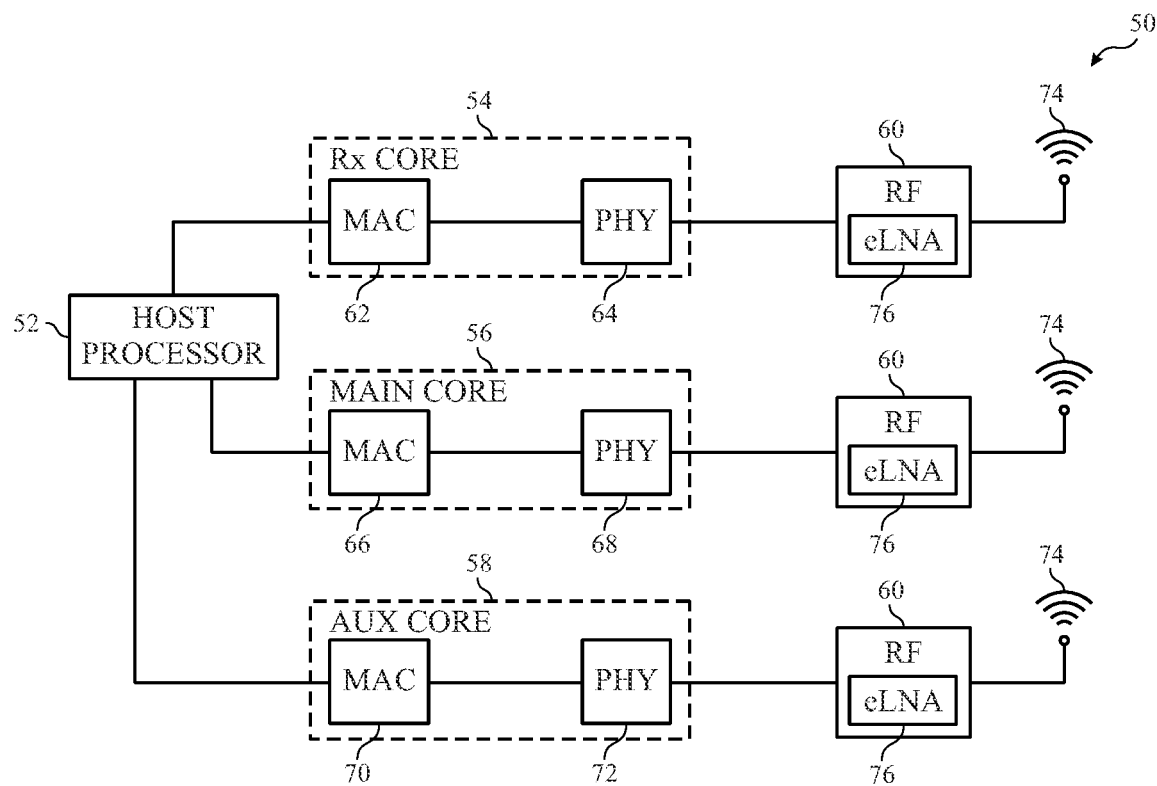
FIG. 7 is a block diagram of an example communication architecture of the electronic device of FIG. 1, according to an embodiment of the present disclosure.

With the foregoing in mind, FIG. 7 is a block diagram of an example communication architecture 50 of the electronic device 10, according to an embodiment of the present disclosure. As illustrated, the example architecture 50 includes a host processor 52, a receiving core 54, a main core 56, an auxiliary core 58, a radio frequency (RF) front end (RFFE) 60, and one or more antennas 74. Various components of the example architecture 50 may correspond to components of the electronic device discussed with respect to FIG. 1. For example, the host processor 52 may correspond to a processor included in the processor core complex 12, the receiving core 54 may correspond to the receiving core 34, the main core 56 may correspond to the main core 28, and the auxiliary core 58 may correspond to the auxiliary core 30.

As shown, the RFFE 60 includes an external low noise amplifier (eLNA) 76. The eLNA 76 may be amplify a received signal without degrading the signal-to-noise ratio. Thus, when the eLNA 76 is activated (e.g., turned on) a distance or range of the scanning function may be increased (e.g., by 5 feet to 100 yards, by 10 feet to 100 feet, by 20 feet), as weaker signals received at greater distances or ranges may be amplified to better recognize data or symbols in the signals.

As illustrated, each of the receiving core 54, the main core 56, and the auxiliary core 58 include a medium access control (MAC) layer 62, 66, 70 and a physical (PHY) layer 64, 68, 72, respectively. The receiving core 54, the main core 56, and the auxiliary core 58 may be coupled to a single, shared antenna 74, or each core 54, 56, and 58 may be coupled to a separate antenna 74.

As discussed above, the receiving core 54 may have limited functionality compared to the main core 56 and the auxiliary core 58. That is, the receiving core 54 may scan for and receive various signals but may not transmit signals. In some embodiments, the receiving core 54 may support a lower bandwidth or data rate compared to the main and auxiliary cores 56, 58 to further reduce the amount of power consumed by the receiving core 54. For example, the receiving core 54 may support a bandwidth of approximately 1 MHz while the main core 56 may support a bandwidth of approximately 1-4 MHz. Thus, when activated, the receiving core 54 may consume less power than the main core 56 and the auxiliary core 58. As a result, the receiving core 54 may consume a same or similar amount of power as the main and/or auxiliary cores 56, 58 while scanning for a longer period of time than the main and/or auxiliary cores 56, 58. In some embodiments, the power consumed by the receiving core 54 may be approximately 50% less than that consumed by the main core 56 alone when transmitting and receiving signals.

In some embodiments, the receiving core 54 may be the "default" core to be used for scanning and receiving wireless signals. If a received signal utilizes a bandwidth that exceeds the bandwidth supported by the receiving core 54, the main core 56 (and/or the auxiliary core 58) may be activated to receive the signal, and the receiving core 54 may be deactivated, or used concurrently with the main core 56 (and/or the auxiliary core 58). Because each core 54, 56, 58 may operate separate and independently from one another, the example architecture 50 may provide multiple, heterogeneous cores 54, 56, 58 for the electronic device 10.

Figure 8A:
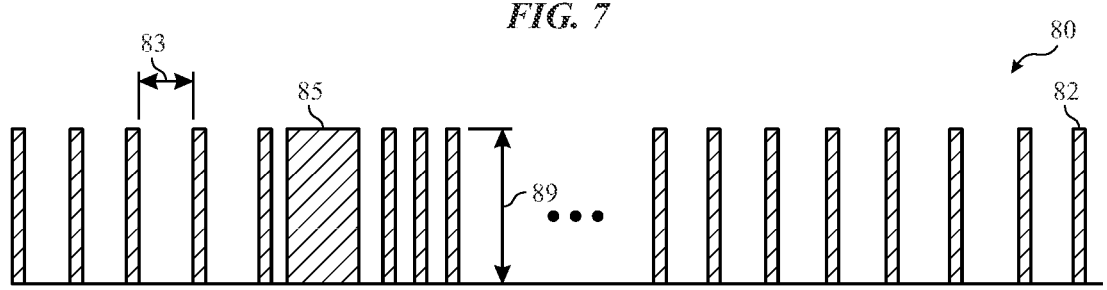
FIG. 8A is an example scanning timing diagram for operating a main core of the example communication architecture of FIG. 7.

FIG. 8A is an example scanning timing diagram 80 for operating the main core 56 of the example architecture 50 of FIG. 7. The timing diagram 80 illustrates scanning for wireless signals (e.g., Wi-Fi or BT beacon signals). In particular, the beacon signals (e.g., including beacon frames) may be sent periodically by a Wi-Fi access point or a BT pairing device to announce the presence of a WLAN or BT network and to synchronize with potential network members. Once a beacon signal has been scanned and received by the electronic device 10, the electronic device 10 may synchronize with the Wi-Fi access point or a BT pairing device, and exchange data.

As illustrated, the main core 56 performs scans 82 at a periodic interval 83 (e.g., every 100 milliseconds) using a scanning power or amplitude 89 (e.g., between 50-90 mW). When a scan 82 finds a beacon sent by a Wi-Fi access point or a BT pairing device, then the main core 56 may join the network provided by the Wi-Fi access point or the BT pairing device to exchange data 85. The main core 56 may subsequently leave the network (e.g., by physically leaving the range of the network, by disconnecting from the network), and resume performing scans 82 at the periodic interval 83 using the scanning amplitude 89.

Figure 8B:
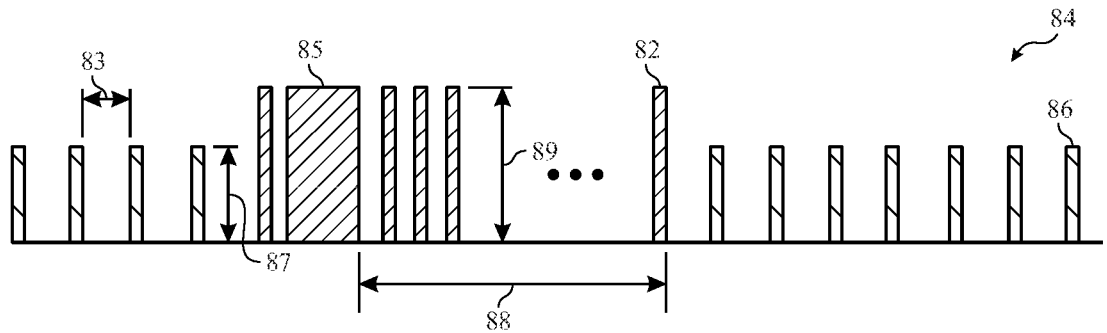
FIG. 8B is an example scanning timing diagram for operating the main core and a receiving core of the example communication architecture of FIG. 7 to reduce power consumption, according to an embodiment of the present disclosure.

As more time passes, a total amount of power consumed by the main core 56 of the electronic device 10 to perform the scans 82 over a given time interval, for example, 24 hours, may add up to a significant amount of power. To reduce the power consumed by the electronic device 10 by performing the scans 82, the receiving core 54 may be activated. For example, FIG. 8B illustrates an example scanning timing diagram 84 for operating the main core 56 and the receiving core 54 of the example architecture 50 of FIG. 7 to reduce power consumption, according to embodiments of the present disclosure. As shown in FIG. 8B, the receiving core 54 may perform scans 86 at the periodic interval 83 using a reduced scanning amplitude 87 (e.g., between 5 and 50 mW) that is significantly less than the scanning amplitude 89 of the main core 56 in FIG. 8A. That is, the amount of power consumed by the receiving core 54 is less than the power consumed by the main core 56 to perform the scans.

As discussed above, the receiving core 54 may have reduced functionality when compared to the main core 56, such as not supporting transmission of signals. Accordingly, once a beacon sent by a Wi-Fi access point or a BT pairing device is found, the main core 56 may be activated to join 85 the Wi-Fi or BT network and transmit and receive data over the network. The main core 56 may subsequently leave the network, and, during a transition or inactivity period 88, the main core 56 may perform scans 82 at the periodic interval 83 using the scanning amplitude 89. The transition period 88 may enable the main core 56 to, for example, rejoin the network, join a new network, or the like. In some embodiments, the transition period 88 may be approximately 2-10 seconds. Once the transition period 88 elapses, the main core 56 may be deactivated and the receiving core 54 may be re-activated to perform scans 86 at the periodic interval 83 using a reduced scanning amplitude 87. In this way, the main core 56 is active long enough to perform functions not supported by the receiving core 54 (e.g., join 85 the network and transmit and receive data) and for the transition period 88 to elapse. In some embodiments, once the main core 56 leaves the network, the main core 56 is deactivated and the receiving core 54 is reactivated without waiting for the transition period 88 to elapse.

In some embodiments, the transition period 88 may be a threshold period that is preconfigured. For example, the transition period 88 may be a fixed length of time, such as 4 seconds. In some embodiments, the transition period 88 may be determined based on various parameters, such as a location of the electronic device 10, a type of the received signal, an origin of the received signal, and the like.

Figure 9A:
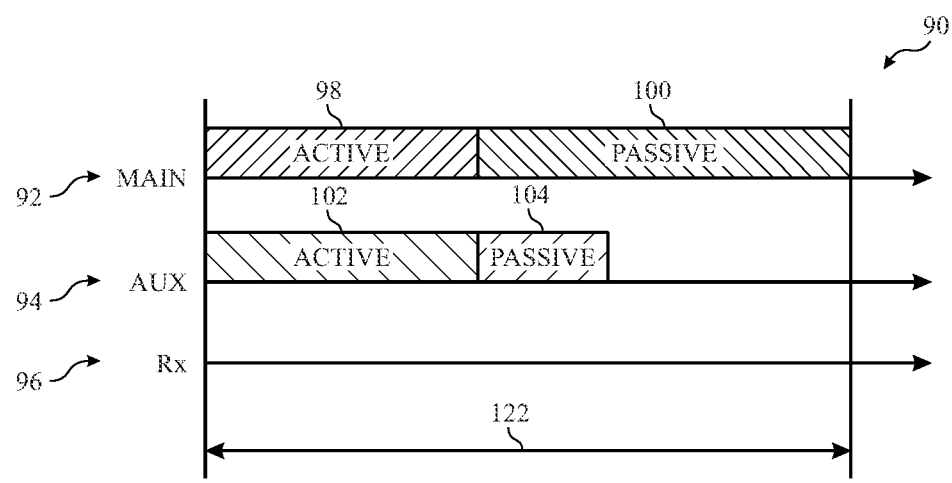
FIG. 9A is an example scanning timing diagram for operating the main core and an auxiliary core of the example communication architecture of FIG. 7.
Figure 9B:
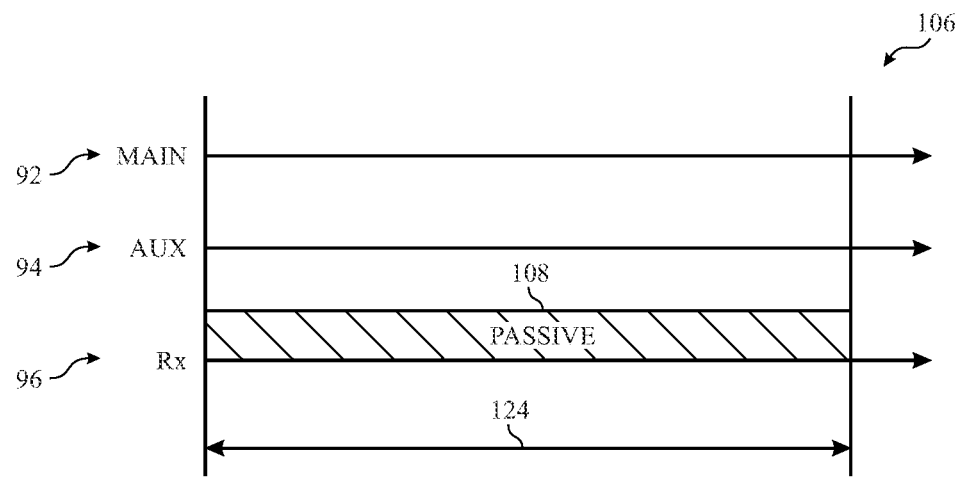
FIG. 9B is an example scan timing diagram for operating the receiving core of the example communication architecture of FIG. 7 that prioritizes reducing power consumption, according to an embodiment of the present disclosure.
Figure 9C:
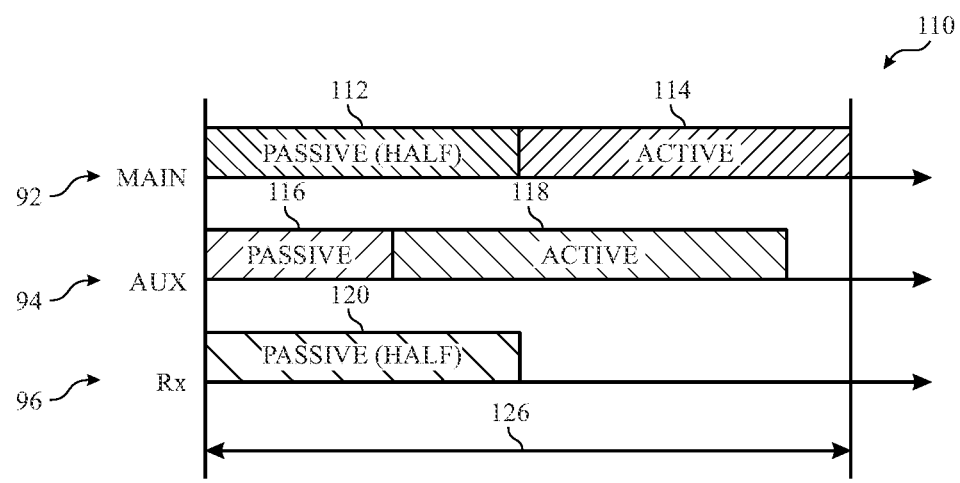
FIG. 9C is an example scan timing diagram for operating the main core, the auxiliary core, and the receiving core of the example communication architecture of FIG. 7 that prioritizes reducing communication delay while reducing power consumption, according to an embodiment of the present disclosure.

FIGS. 9A-9C illustrate example scanning timing diagrams 90, 106, 110, respectively, according to embodiments of the present disclosure. Each scanning timing diagram 90, 106, 110 corresponds to a certain example configuration of the main core 92, the auxiliary core 94, and the receiving core 96, respectively, for signals and data transmitted via Wi-Fi, though it should be understood that the configurations may be applied to any suitable communication technology. Each core 92, 94, 96 may scan the same or different bandwidths, or scan the same or a different channel.

As discussed below, an "active" scan may refer to a scan by a corresponding core during which a signal or probe is transmitted. The transmitted signal may request a response from a target device, such as a wireless access point. That is, the transmitted signal may request one or more data packets from the access point in response to the transmitted signal. A "passive" scan may refer to a scan by a corresponding core during which the core is listening (e.g., scanning) for various signals without transmitting a signal. As an example, a passive scan may include listening for a beacon signal from a wireless access point, as discussed with respect to FIGS. 8A and 8B.

In operation, an active scan using Wi-Fi may include a probe request is transmitted to the target device by the main core 56. The main core 56 (or receiving core 54) listens for a response to the probe from the target device. That is, for an active Wi-Fi scan, the main core 56 is activated for at least a portion of the scanning operation to transmit the probe. Thus, during an active scan, the scanning window of the main core 56 may be greater than a scanning window of the receiving core 54. In contrast, a passive scan using Wi-Fi may be executed wholly by the receiving core 54. For example, during a passive Wi-Fi scan, the receiving core 54 may listen (e.g., scan) for various signals. However, in some embodiments, the passive Wi-Fi scan may be executed entirely by the main core 56 or by a combination of the main core 56 and the receiving core 54.

During a passive scan using BT, the receiving core 54 (or the main core 56) may listen (e.g., scan) for various BT signals. That is, the BT passive scan may be performed entirely by the receiving core 54 because a probe may not be transmitted. During an active BT scan, the main core 56 may respond to each received BT signal. That is, the main core 56 or the receiving core 54 may listen for a BT signal. Once the BT signal is received from a device, the main core 56 may be used to transmit a response to that device.

A scanning window (e.g., a length of time for performing the scanning operation) of a passive scan may be greater than a scanning window of an active scan. For example, during a passive scan, the core being used (e.g., the main core 56 and/or receiving core 54) waits to receive an external signal. That is, the scanning window for the passive scan may depend on an interval at which the external signal is received. A scanning window of an active scan may be less than the scanning window of the passive scan because the probe transmitted by the main core 56 actively seeks a target device and requests a response. In other words, a scan window for the main core 56 and/or the receiving core 54 may be determined based on a scan type (e.g., active or passive).

Advantageously, a passive scan may provide improved privacy over an active scan. For example, an electronic device of a particular user, for example, the electronic device 10 of FIG. 1, may transmit an anonymous wireless beacon signal. Other electronic devices in proximity of the electronic device 10 may receive the wireless beacon and store the beacon and information identifying the electronic device 10 (but not the user of that electronic device 10) in a private log. The private log may be used by, for example, health officials for contact tracing. For example, health officials may use the private log to transmit an anonymous notification to a user of the electronic device 10 that they may have come in contact with or been in close proximity to a person that has been diagnosed with a virus or infectious disease.

For example, a receiving core 54 of the electronic device 10 may scan for and receive one or more BT beacons from one or more other electronic devices that are near or in close proximity to the electronic device 10. The BT beacons may be transmitted by each of the other electronic devices periodically (e.g., every 15 minutes). In some embodiments, the electronic device 10 may also periodically transmit a BT beacon which is received by the other electronic devices.

Upon receiving a BT beacon from another electronic device, the electronic device 10 may store anonymous information related to the received BT beacon. That is, the electronic device 10 may store anonymous information identifying the other electronic device without compromising privacy of a user of the other electronic device. For example, the BT beacon may include a Universally Unique Identifier (UUID) that uniquely identifies the other electronic device, but may not include user-identifying information (e.g., name, contact information, or other information unique to the user). The anonymous information may be stored in a temporary, private log on the electronic device 10. The log may include anonymous information related to multiple BT beacons received from multiple other electronic devices for a particular time period (e.g., approximately two weeks). In some embodiments, the log may not be accessible to the user of the electronic device 10.

Once a user of the electronic device 10 and/or the other electronic devices is diagnosed with a virus, infectious disease, or communicable condition, health officials may use the log (e.g., via a software application stored and executing on the electronic device 10 and/or the other electronic devices) to identify and anonymously notify users of the electronic device 10 and/or users of other electronic devices identified in the log that may have been in close proximity with the infected user. To maintain privacy of the users of the electronic device 10 and other electronic devices, a contact tracing feature may be approved or disapproved by each user. That is, each user may have the option to opt-in or opt-out of the contract tracing feature of the electronic device 10.

As discussed herein, the receiving core 54 may consume less power than another core, such as the main core 56, when scanning. Thus, by utilizing the receiving core 54, the electronic device 10 may use less power than scanning with the main core 56, or scan for the BT beacons more often and/or for a longer period of time than if another core (e.g., the main core 56) was used. That is, the receiving core 54 may have a higher duty cycle for scanning than another scan core (e.g., the main core 56) while consuming less or the same power. Thus, the receiving core 54 enables the electronic device 10 to maintain a more accurate and comprehensive log of the other devices that have been near or in close proximity to the electronic device 10 over a period of time. A flowchart for contact tracing is provided in FIG. 18 below.

FIG. 9A illustrates a scanning timing diagram 90 for operating a main core 92 and an auxiliary core 94 of the example communication architecture 50 of FIG. 7, without activating the receiving core 96. That is, the main core 92 actively scans 98 for a period of time 99 before switching to a passive scan 100. Concurrently, the auxiliary core 94 may also actively scan 102 for a same or similar period of time 99 as the active scan 98 of the main core 92 before switching to a passive scan 104. A length of the passive scan 104 of the auxiliary core 94 may be less than a length of the passive scan 100 of the main core 92. The scans 98, 100, 102, and 104 may be performed within a total time period 122. The scanning timing diagram 90 enables a combination of increased likelihood of detection (e.g., of a wireless signal, a beacon signal) through the active scans 98, 102, and some degree of power savings through the passive scans 100, 104 and deactivation of the auxiliary core 94 (for the time period 105).

FIG. 9B illustrates a scanning timing diagram 106 for operating the receiving core of the example communication architecture 50 that prioritizes reducing power consumption, according to embodiments of the present disclosure. That is, the receiving core 96 passively scans 108 for a period of time 124. While the receiving core 96 is scanning, no other cores (e.g., 92, 94) are passively or actively scanning. Thus, the scan timing diagram 106 may consume less power than other scan timing configurations. Further power reduction may be realized by decreasing the frequency of scanning by the receiving core 96.

FIG. 9C illustrates a scanning timing diagram 110 for operating the main core 92, the auxiliary core 94, and the receiving core 96 that prioritizes reducing communication delay while reducing power consumption, according to embodiments of the present disclosure. As shown, the main core 92 passively scans 112 at half power (or half frequency) for a period of time before switching to an active scan 114. The auxiliary core 94 passively scans 116 for a period of time before switching to an active scan 118. The receiving core 96 passively scans at half power (or half frequency) for a period of time before the receiving core 96 is deactivated. A duration of the passive scan 120 of the receiving core 96 may be the same or similar to a duration of the passive scan 112 of the main core 92. A duration of the passive scan 116 of the auxiliary core 94 may be less than the duration of the passive scan 112 of the main core 92. The scans 112, 114, 116, 118, and 120 may be performed within a total time period 126. In this manner, overall scanning may be performed more frequently over the period 126, enabling quicker detection of a wireless signal (e.g., a beacon signal), thus reducing communication delay.

Figure 10A:
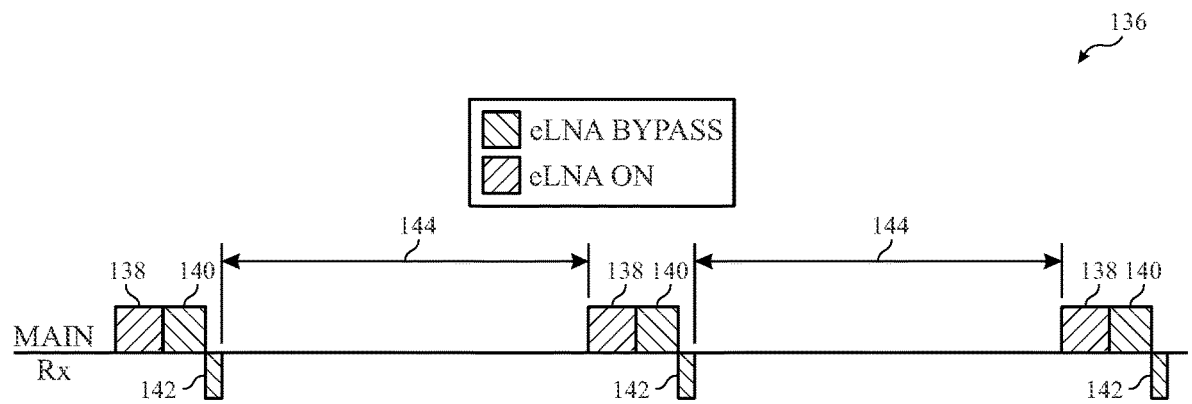
FIG. 10A is an example scan timing diagram for active scanning using the main core and the receiving core of the example communication architecture of FIG. 7, according to an embodiment of the present disclosure.
Figure 10B:
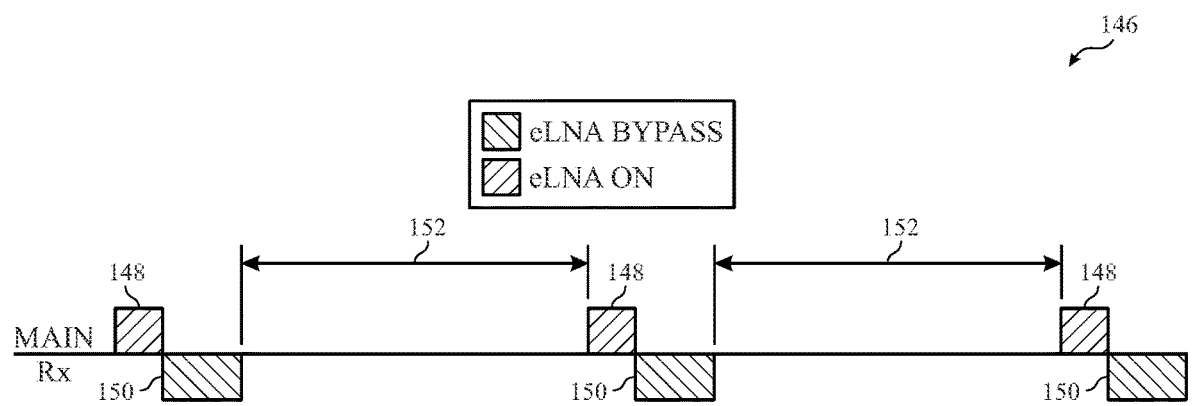
FIG. 10B is an example scan timing diagram for passive scanning using the main core and the receiving core of the example communication architecture of FIG. 7, according to an embodiment of the present disclosure.
Figure 10C:
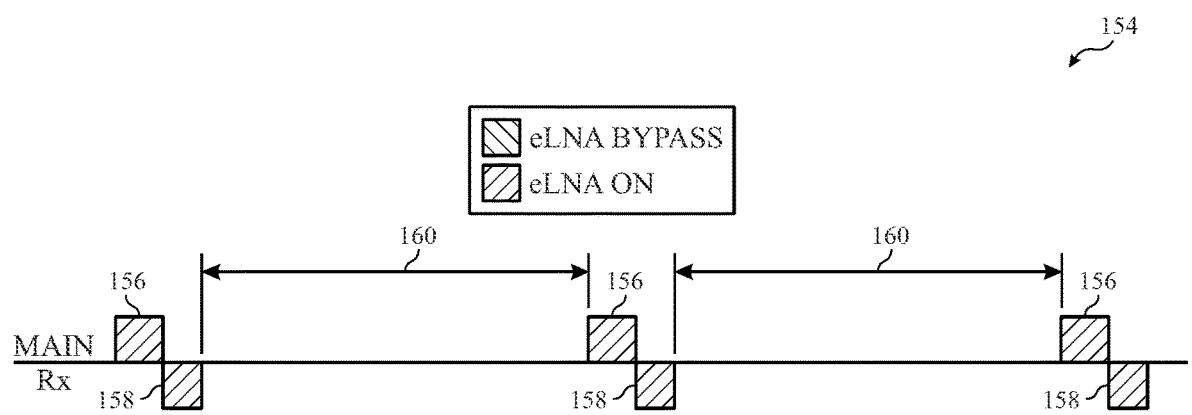
FIG. 10C is an example scan timing diagram for passive scanning and prioritizing scanning range using the main core and the receiving core of the example communication architecture of FIG. 7, according to an embodiment of the present disclosure.

FIGS. 10A-10C illustrate example scan timing diagrams 136, 146, 154, respectively, using the main core 56 and the receiving core 54 of the example communication architecture 50 of FIG. 7, according to embodiments of the present disclosure. The scan timing diagrams 136, 146, 154 may correspond to scanning functionality of the various cores 54, 56, 58 for signals and data transmitted via BT, though it should be understood that the configurations may be applied to any suitable communication technology. As discussed below, some scan periods may include use of an eLNA 76. The eLNA 76 may be amplify a received signal without degrading the signal-to-noise ratio. Thus, when the eLNA 76 is activated (e.g., turned on) a distance or range of the scanning function of the respective core 54, 56, 58 may be increased. That is, the cores 54, 56, 58 may receive and process a signal (e.g., a beacon signal) from further away the eLNA activated than without, because a received signal that is too weak to be processed (e.g., where data or symbols in the received signal are not identifiable or are indistinguishable from noise) may be amplified by the eLNA and processed.

FIG. 10A is an example scan timing diagram 136 for active scanning using the main core 56 and the receiving core 54, according to an embodiment of the present disclosure. In particular, FIG. 10A depicts a first scan interval 138 of the main core 56 with its eLNA on and a second scan interval 140 of the main core 56 with its eLNA off (e.g., bypassed). A receive scan interval 142 of the receiving core 54 is depicted with its eLNA off. Accordingly, active scanning during the first scan interval 138 may have a greater range than during the second scan interval 140 or the receive scan interval 142. As illustrated, the first scan interval 138 and the second scan interval 140 of the main core 56 are consecutive. Once the second scan interval 140 of the main core 56 elapses, the receiving core 54 is activated for the receive scan interval 142.

A duration of the first scan interval 138 of the main core 56 may be, for example, approximately 30 milliseconds. A duration of the second scan interval 140 of the main core 56 may be, for example, approximately 27 milliseconds. A duration of the scan interval 142 of the receiving core 54 may be, for example, approximately 10 seconds. Thus, a total scan interval depicted in FIG. 10A is approximately 67 milliseconds. After the scan intervals 138, 140, 142, the cores 54, 56 may be deactivated for an inactivity period 144. In some embodiments, the inactivity period 144 may be approximately 2-10 seconds, such as approximately 4 seconds. While the scan intervals 138, 140, 142 are described as active scanning, it should be understood that any of these intervals may include passive scanning. In this way, using the receiving core 54 to perform active scanning (e.g., when compared to using the main core 56 to perform active scanning for the scan intervals 138, 140, and 142) can reduce power consumption of the electronic device 10.

FIG. 10B is an example scan timing diagram 146 for passive scanning using the main core 56 and the receiving core 54, according to an embodiment of the present disclosure. In particular, FIG. 10B depicts a scan interval 148 of the main core 56 with its eLNA on and a receive scan interval 150 of the receiving core 54 with its eLNA off. Accordingly, active scanning during the scan interval 148 may have a greater range than during the receive scan interval 150. Once the scan interval 148 of the main core 56 elapses, the receiving core 54 is activated for the receive scan interval 150. A duration of the scan interval 148 of the main core 56 may be, for example, approximately 30 milliseconds. A duration of the receive scan interval 150 of the receiving core 54 may be, for example, approximately 50 milliseconds. That is, a total scan interval for the scan timing diagram 146 (including 148 and 150) may be longer than the scan interval for the scan timing diagram 136 depicted in FIG. 10A (including 138, 140, and 142).

After the scan intervals 148, 150, the cores 54, 56 may be deactivated for an inactivity period 152. In some embodiments, the inactivity period 152 may be approximately 2-10 seconds, such as approximately 6 seconds. While the scan intervals 148, 150 are described as active scanning, it should be understood that either of these intervals may include passive scanning. In this way, using the receiving core 54 to perform active scanning (e.g., when compared to using the main core 56 to perform active scanning for the scan intervals 148, 150) can reduce power consumption of the electronic device 10.

The receiving core 54 consumes less power than the main core 56. Thus, a total power consumption of the total scan interval of the scan timing diagram 146 in FIG. 10B may be the same as or less than the total power consumption of the total scan interval of the scan timing diagram 136 in FIG. 10A, while the scanning for a longer time (e.g., 148 and 150 in the scan timing diagram 146 in FIG. 10B compared to 138, 140, and 142 in the scan timing diagram 136 in FIG. 10A). That is, because the duration of the scan interval 148 of the main core 56 in FIG. 10B is less than the duration of total scan interval (138 and 140) of the main core 56 in FIG. 10A, the total power consumption of the scan timing diagram 146 of FIG. 10B is reduced. Accordingly, a scan timing configuration of the various cores (e.g., the main core 56 and the receiving core 54) can be configured such that the duration of the scan configuration is longer while the power consumption is reduced.

FIG. 10C is an example scan timing diagram 154 for passive scanning and prioritizing scanning range using the main core 56 and the receiving core 54, according to an embodiment of the present disclosure. In particular, FIG. 10C depicts a scan interval 156 of the main core 56 with its eLNA on and a receive scan interval 158 of the receiving core 54 with its eLNA on. Accordingly, active scanning during the scan interval 156 may have the same or a similar range as the receive scan interval 158. A duration of the scan interval 156 of the main core 56 may be, for example, approximately 30 milliseconds while a duration of the receive scan interval 158 of the receiving core 54 may be, for example, approximately 25 milliseconds. Thus, the total scan interval for the scan timing diagram 154 of FIG. 10C is approximately 55 milliseconds, which is less than the total scan interval of the scan timing diagram 146 depicted in FIG. 10B.

After the scan intervals 156, 158, the cores 54, 56 may be deactivated for an inactivity period 160. In some embodiments, the inactivity period 160 may be approximately 2-10 seconds, such as approximately 8 seconds. While the scan intervals 156, 158 are described as active scanning, it should be understood that any of these intervals may include passive scanning. In this way, using the receiving core 54 to perform active scanning (e.g., when compared to using the main core 56 to perform active scanning for the scan intervals 156, 158) can reduce power consumption of the electronic device 10.

As discussed above, the eLNA is turned on for the scan interval 156 and the receive scan interval 158. Thus, the power consumption of the scan timing diagram 154 of FIG. 10C may be the same as or less than the power consumption of the scan timing diagram 146 of FIG. 10B, while scanning over a greater range. Thus, the scan timing diagram 154 of FIG. 10C may conserve more power and provide an increased scanning range when compared to the scan timing diagram 146 of FIG. 10B.

In some embodiments, the main core 56 and the receiving core 54 may operate concurrently. That is, the main core 56 and the receiving core 54 may simultaneously scan for different signals on a different channel and/or frequency. In that case, there may not be an inactivity period 160 between scans. That is, there may be no inactivity period 160 between scans performed by the main core 56 and no inactivity period 160 between scans using the receiving core 54. Advantageously, concurrent scanning with the main core 56 and the receiving core 54 may improve a performance of the scanning operation (e.g., reduced discovery time and/or improved range), even though power consumption may be increased.

Figure 11:
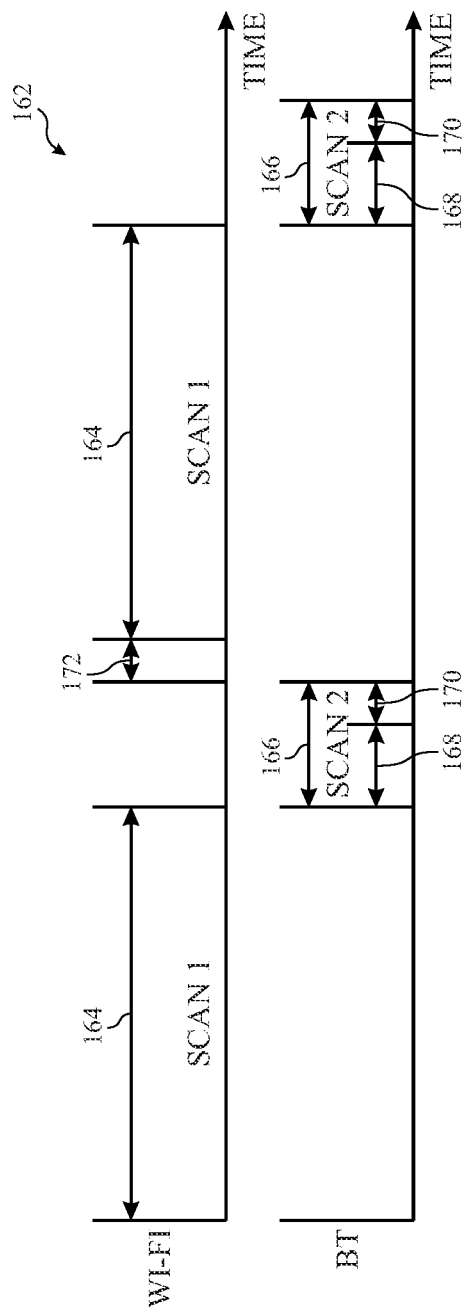
FIG. 11 is an example scan timing diagram for communicating with multiple communication technologies using the main core and the receiving core of the example communication architecture of FIG. 7, according to an embodiment of the present disclosure.

FIG. 11 is an example scanning timing diagram 162 for communicating with multiple communication technologies using the main core 56 and the receiving core 54 of the example communication architecture 50 of FIG. 7, according to an embodiment of the present disclosure. As illustrated, the scanning timing diagram 162 includes a first scan period 164 (SCAN 1) for Wi-Fi signals and a second scan period 166 (SCAN 2) for BT signals. The first scan period 164 and the second scan period 166 may be executed by the main core 56 and/or the receiving core 54, as discussed with respect to FIGS. 9A-9C and FIGS. 10A-10C, respectively. The first scan period 164 and the second scan period 166 may each be executed by a single scanning core or may be split into multiple scans by more than one scanning core. For example, as illustrated, the second scan period 166 may include a first portion 168 and a second portion 170. The first portion 168 may be executed by the main core 56 while the second portion may be executed by the receiving core 54.

An inactivity period 172 may separate the first scan period 164 and the second scan period 166. The main core 56 and the receiving core 54 may be deactivated during the inactivity period 172. In some embodiments, a duration of the inactivity period 172 may be between about 2 seconds and about 10 seconds, such as approximately 4 seconds. A duration of the first scan period 164 may be longer than a duration of the second scan 166, such that the first scan period 164 is given preference over the second scan period 166. In some embodiments, the duration of the second scan period 166 may be longer than the duration of the first scan 164. In this manner, using the receiving core 54 to scan for at least a portion of the duration of the second scan period 166 and by deactivating the cores 54, 56 during the inactivity period 172 may significantly reduce power consumption of the electronic device 10 and conserve battery power thereof. Using the receiving core 54 and deactivating the cores 54, 56 may also improve a performance of the scanning operation for a given power budget by decreasing a discovery time (e.g., a time to receive a signal) of the scanning operation and increasing a range of the scanning operation.

Figure 12:
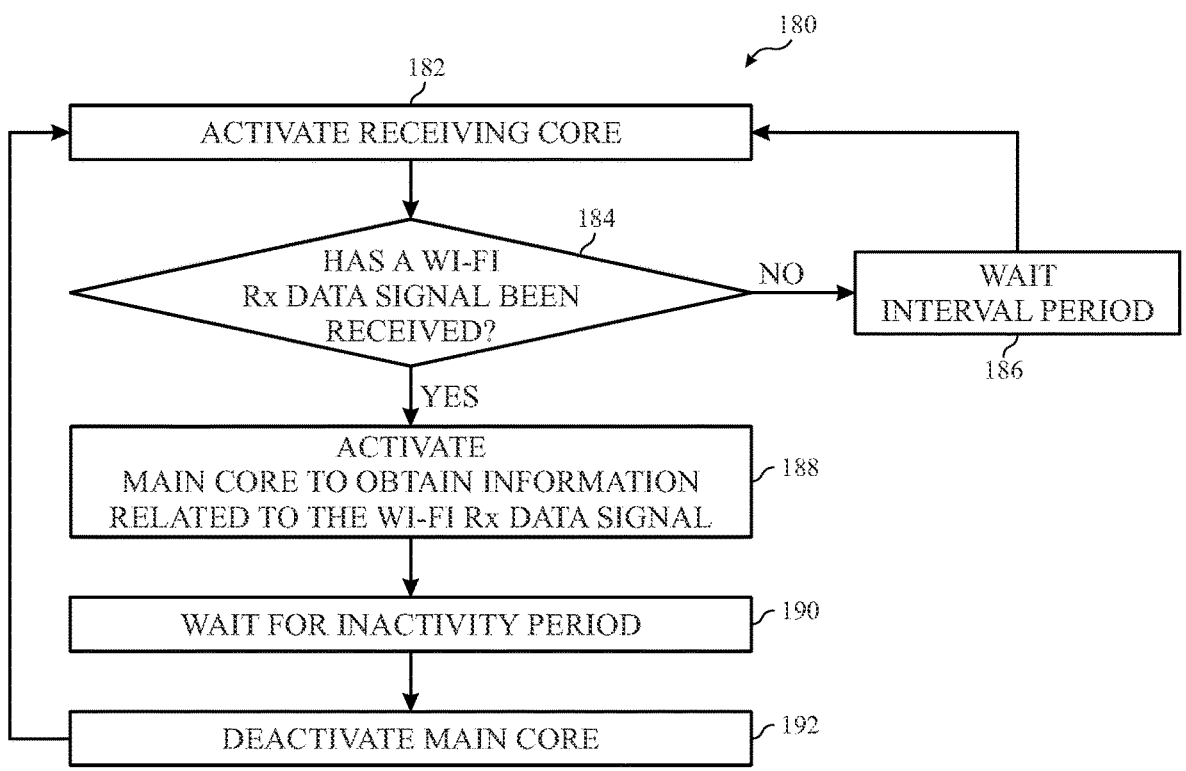
FIG. 12 is a flowchart for scanning with a receiving core and activating a main core of the example communication architecture of FIG. 7 once a signal is received, according to an embodiment of the present disclosure.

FIG. 12 is a flowchart 180 illustrating scanning with a receiving core and activating a main core once a signal is received, according to an embodiment of the present disclosure. The example operations of the flowchart 180 may be performed by one or more components of the electronic device 10 of FIG. 1, including, for example, the processor 12, the main core 28, the auxiliary core 30, and/or the receiving core 34. Moreover, the flowchart 180 is merely an example of the operations that may be performed, and at least some operations of the flowchart 180 may be performed in a different order or skipped altogether. The operations of the flowchart 180 may correspond to scanning for a Wi-Fi signal. That is, the operations of the flowchart may correspond to embodiments discussed with respect to FIGS. 8A, 8B, and 9A-9C.

The flowchart 180 begins at operation 182 where the receiving core 54 is activated. At operation 184, a determination is made whether a data signal is received which indicates data being transmitted to the electronic device 10. If such a data signal has not been received, the receiving core 54 waits for an interval period (e.g., an inactivity period) at operation 186. Once a data signal indicating data being transmitted is received, the main core 56 is activated at operation 188 to obtain the data related to the received signal. In some embodiments, the receiving core 54 may be deactivated at operation 188 to further conserve power consumption.

Once the data is obtained, the main core 56 remains activated for an inactivity period at operation 190. The inactivity period ensures that no additional data related to the received data signal is transmitted to the main core 56. At operation 192, the main core 56 is deactivated and the receiving core 54 is then activated at operation 182.

The operations of the flowchart 180 may correspond to operations of the main core 56 and the receiving core 54 with respect to receiving data signals and associated data via Wi-Fi. That is, the operations of the flowchart 180 may correspond to the embodiments discussed with respect to FIGS. 8A, 8B, 9A-9C, and 11. Utilizing the receiving core 54 to scan for data signals and by deactivating the main core 56 when not in use may significantly reduce power consumption of the electronic device 10 and conserve battery power thereof.

Figure 13:
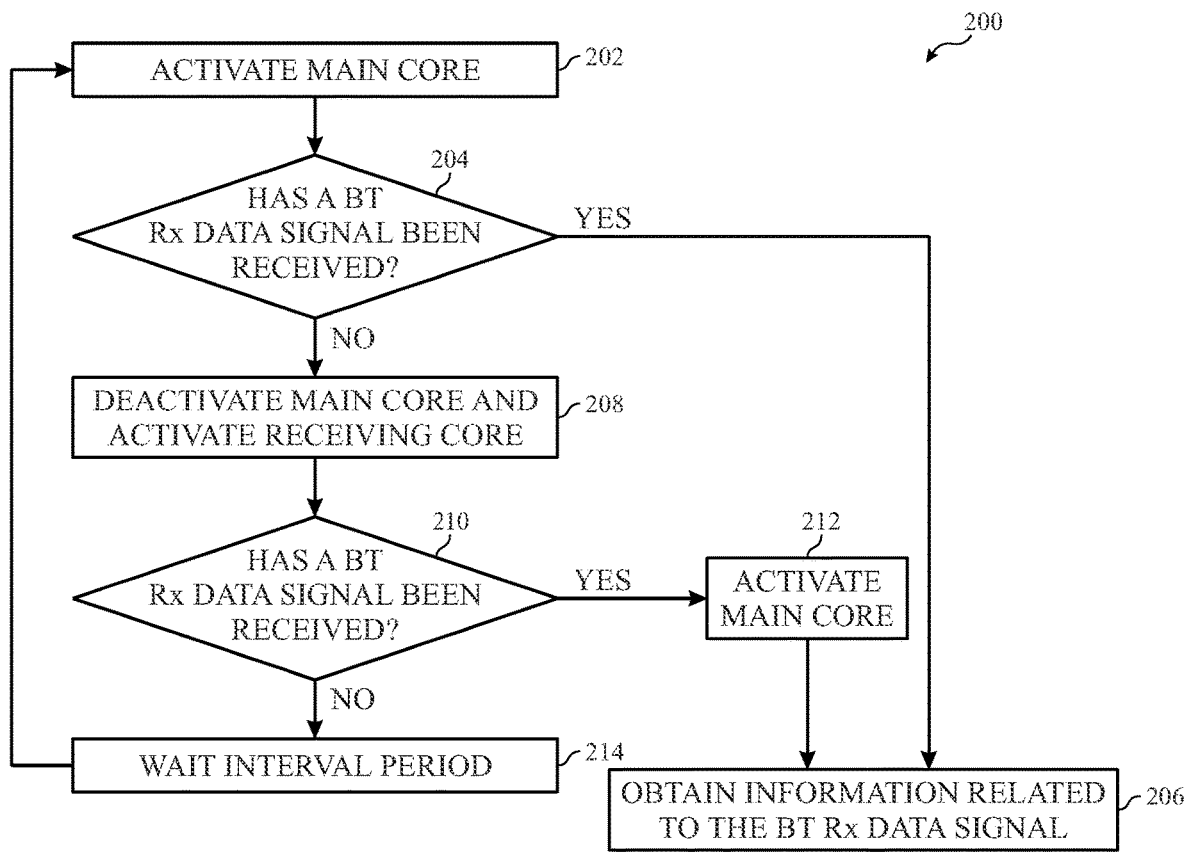
FIG. 13 is a flowchart for reducing power consumption during a scanning operation by deactivating the main core and scanning with a receiving core, according to an embodiment of the present disclosure.

FIG. 13 is a flowchart 200 illustrating for reducing power consumption during a scanning operation by deactivating the main core and scanning with a receiving core, according to an embodiment of the present disclosure. The example operations of the flowchart 200 may be performed by one or more components of the electronic device 10 of FIG. 1, including, for example, the processor 12, the main core 28, the auxiliary core 30, and/or the receiving core 34. Moreover, the flowchart 200 is merely an example of the operations that may be performed, and at least some operations of the flowchart 200 may be performed in a different order or skipped altogether. The operations of the flowchart 200 may correspond to scanning for a BT signal. That is, the operations of the flowchart may correspond to embodiments discussed with respect to FIGS. 10A-10C.

The flowchart 200 begins at operation 202 where the main core 56 is activated. At operation 204, a determination is made whether a data signal has been received which indicates data being transmitted to the main core 56. If such a data signal is received, the main core 56 obtains the transmitted data at operation 206. Although not shown, after operation 206, the flowchart 200 may proceed to operation 214 where the main core 56 waits for an interval period to ensure all transmitted data is obtained. If a data signal indicating data being transmitted is not received, the main core 56 is deactivated and the receiving core 54 is activated at operation 208.

At operation 210, a determination is made whether a data signal received by the receiving core 54 indicates data being transmitted. If such a data signal is received, the main core 56 is activated at operation 212 and obtains the data at operation 206. If such a data signal has not been received, the receiving core 54 may wait for an interval period before the flowchart proceeds to operation 202 where the main core 56 is activated.

The operations of the flowchart 200 may correspond to operations of the main core 56 and the receiving core 54 with respect to receiving data signals and associated data via BT. That is, the operations of the flowchart 200 may correspond to the embodiments discussed with respect to FIGS. 8A, 8B, 10A-10C, and 11. By deactivating the main core 56 at operation 208 and utilizing the receiving core 54, the operations of the flowchart 200 may reduce the power consumed by the electronic device 10 while scanning for various data signals and obtaining related data.

Example applications to the operations of the flowchart 200 may include a background scan for data signals while the electronic device 10 is in a low-power mode (e.g., sleep mode) or while the display 18 of the electronic device 10 is turned off. The operations of the flowchart 200 may also be used to scan for external devices to connect to and in close proximity to the electronic device 10 such as wearable devices. Further, the operations of the flowchart 200 may be used to identify a particular electronic device for communication with a software application executing on the electronic device 10.

Figure 14:
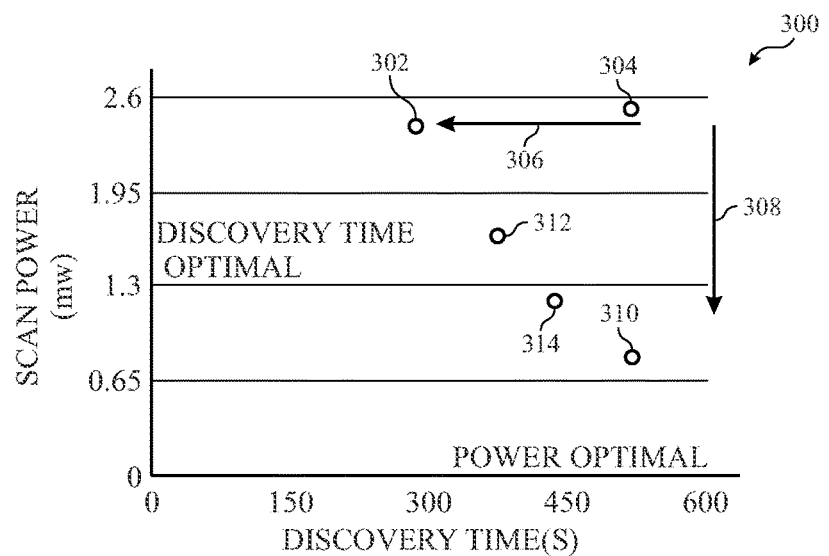
FIG. 14 is a chart depicting a tradeoff between scan time and power efficiency using the receiving core and the main core of the example communication architecture of FIG. 7, according to an embodiment of the present disclosure.

FIG. 14 is a chart 300 depicting a tradeoff between scan time and power efficiency, according to an embodiment of the present disclosure. As illustrated, a vertical axis of the chart 300 shows total power consumed during a scan operation and a horizontal axis shows a total time to perform the scan operation. A horizontal arrow 306 corresponds to increased usage of the main core 56 and a vertical arrow 308 corresponds to increased utilization of the receiving core, during the scanning operation. That is, as utilization of the receiving core 54 is increased during the scanning operation, less power is consumed (i.e., power saved is increased) while a duration of the scanning operation may be increased due to switching between the cores and reduced range of the scanning operation. Conversely, as utilization of the main core 56 is increased during the scanning operation, more power is consumed (i.e., power saved is reduced) while the duration of the scanning operation is reduced.

Nodes 302, 310, 312, and 314 illustrate various combinations of main core 56 and receiving core 54 utilization. Node 304 illustrates using the main core 56 to perform scan operations without using the receiving core 54. As illustrated by node 302, by configuring the electronic device 10 to reduce or optimize discovery time of a wireless signal or beacon signal (e.g., by increasing the frequency and/or range of scans, such as by implementing the example scan timing diagram 110 of FIG. 9C), discovery time may be reduced to less than 300 seconds while consuming less than 2.6 mW. In contrast, using only the main core 56 to perform scan operations without using the receiving core 54, as illustrated by node 304, results in much greater discovery time (e.g., approximately 500 seconds) while consuming greater power (e.g., just less than 1.6 mW). As illustrated by node 310, by configuring the electronic device 10 to reduce or optimize power (e.g., by utilizing the receiving core 54, such as by implementing the example scan timing diagram 106 of FIG. 9B), the electronic device 10 may consume approximately 0.7 mW, while taking approximately 500 seconds to discover a wireless signal or beacon signal. Referring back to node 304, using only the main core 56 to perform scan operations without using the receiving core 54 results in consuming much greater power (e.g., just less than 1.6 mW) for approximately the same discovery time (e.g., approximately 500 seconds).

Figure 15:
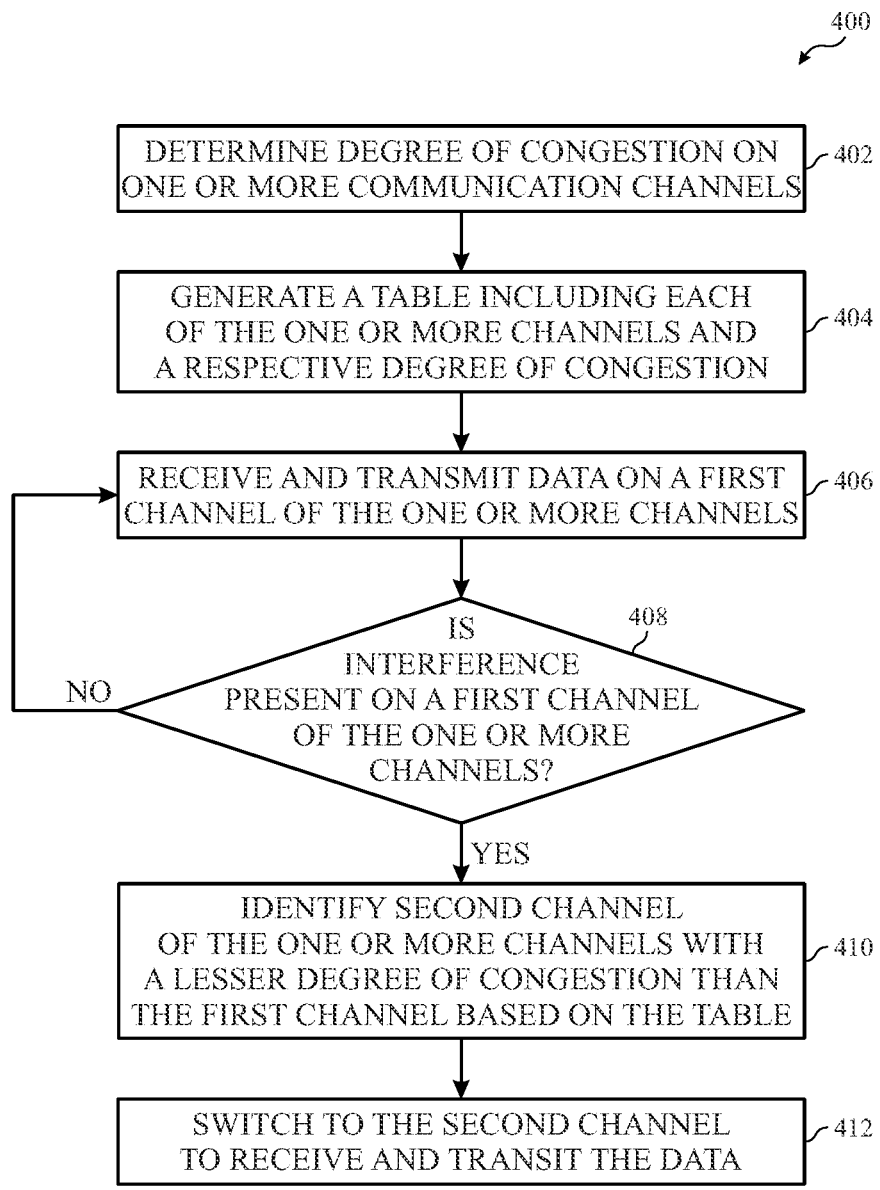
FIG. 15 is a flowchart for scanning for available channels using the receiving core while communicating with the main core on another channel of the example communication architecture of FIG. 7, according to an embodiment of the present disclosure.

FIG. 15 is a flowchart 400 illustrating for scanning for available channels using the receiving core 54 while communicating with the main core 56 on another channel, according to an embodiment of the present disclosure. The example operations of the flowchart 400 may be performed by one or more components of the electronic device 10 of FIG. 1, including, for example, the processor 12, the main core 28, the auxiliary core 30, and/or the receiving core 34. Moreover, the flowchart 400 is merely an example of the operations that may be performed, and at least some operations of the flowchart 400 may be performed in a different order or skipped altogether.

The flowchart 400 begins at operation 402 where the processor 12 instructs the receiving core 54 to determine a degree of congestion on multiple wireless communication channels. For example, the receiving core 54 may monitor the multiple channels and determine a degree of congestion on each channel. At operation 404, the receiving core 54 generates a table including each of the multiple channels and a respective degree of congestion. At operation 406, the main core 56 receives and transmits signals and/or data via a first channel of the multiple channels. That is, the processor 12 may determine that the table indicates that the first channel of the multiple channels to have a lesser (e.g., the lowest) degree of congestion, and may instruct the main core 56 to communicate (e.g., with another electronic device, an access point, a base station) using the first channel.

At operation 408, the main core 56 determines whether interference is present on a first channel of the multiple channels in use by the main core 56. If interference is not present on the first channel, the main core 56 continues to receive and transmit signals and/or data via the first channel at operation 406. If interference is present on the first channel, the processor 12 identifies a second channel of the multiple channels with a lesser degree of congestion than the first channel based on the table at operation 410. In some embodiments, the processor 12 may instruct the receiving core 54 to determine the degree of congestion (e.g., again) on the multiple wireless channels, and update the table accordingly. Indeed, the receiving core 54 may regularly and periodically determine the degree of congestion on the multiple wireless channels update the table. At operation 412, the main core switches to the second channel to continue receiving and transmitting data via the second channel. In some embodiments, the main core 56 may not determine whether there is interference on the first channel, and, instead, the processor 12 may instruct the main core 56 to switch channels to a less congested channel based on the receiving core 54 determining another channel having less congestion than the first channel.

Advantageously, the receiving core 54 may monitor the degree of congestion on the other multiple channels while the main core 56 receives and transmits data on the first channel. In this way, the receiving core 54 may reduce a delay of transmitting and receiving data and/or reduce a likelihood of dropped data (e.g., packets) due to congestion on the first channel. That is, the table generated by the receiving core 54 may enable the processor 12 to dynamically identify a channel with a low degree of congestion.

The flowchart 400 may be advantageous for high data rate and low latency wireless communications. For example, the operations of the flowchart 400 may be used for augmented reality (AR) and/or virtual reality (VR) applications. The operations of the flowchart 400 may also be used for a second wireless display used with a laptop and/or desktop computer. These applications may use a WLAN which allows many devices to share a common resource and/or communication channel. The devices may utilize a Carrier Sense Multiple Access (CSMA) and/or a Collision Avoidance (CA) protocol. CSMA and CA protocols with fair access for all the devices divides available bandwidth between the devices which may lead to significantly increased latencies. Identifying a particular channel with a lower degree of congestion may enable high date rate and reduced latency. Thus, the operations of the flowchart 400 enable such communication (e.g., high data rate and low latency) while reducing a delay caused by any congestion.

Figure 16:
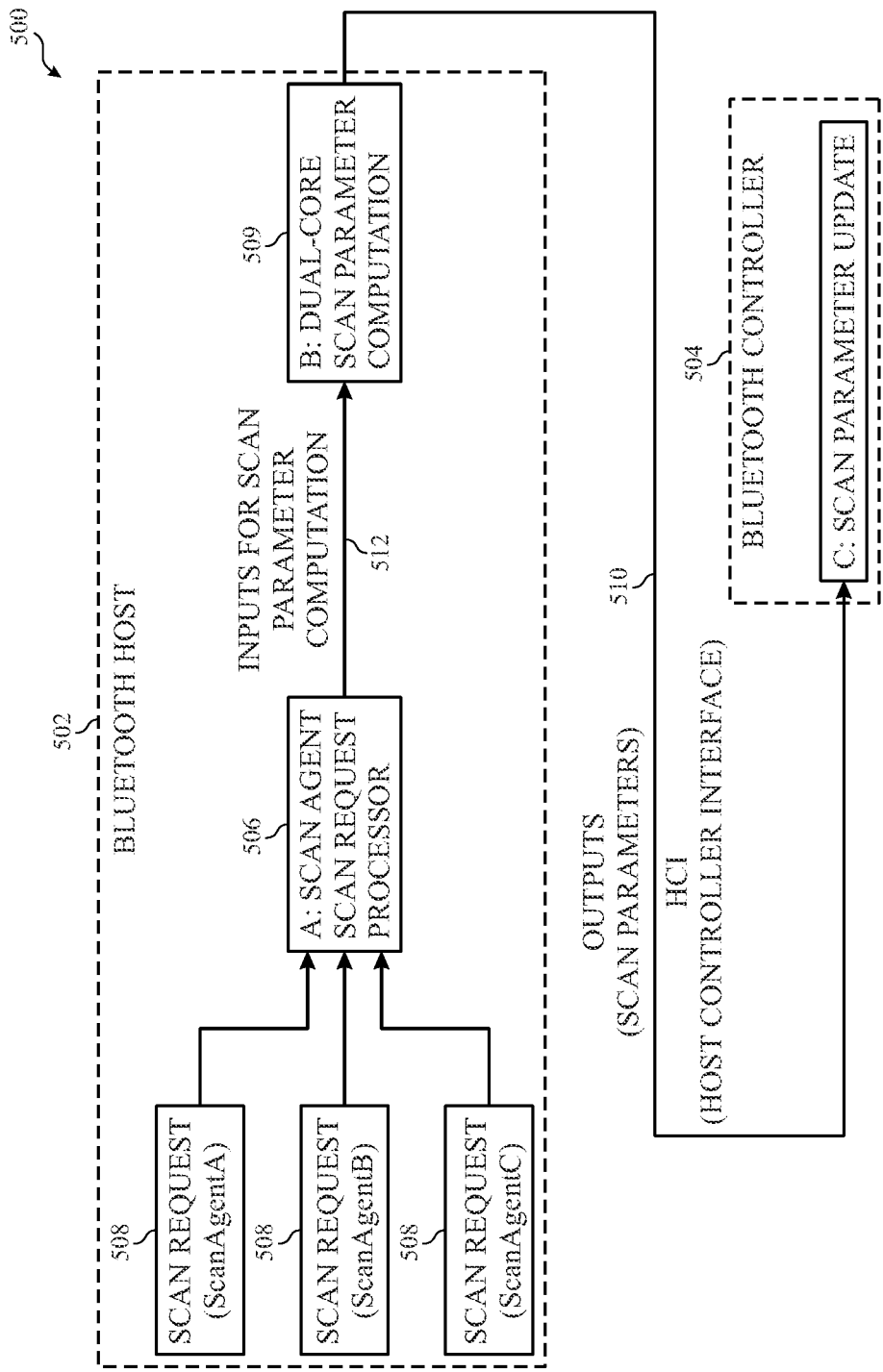
FIG. 16 illustrates an example block diagram for combining scan requests, according to an embodiment of the present disclosure.

FIG. 16 illustrates an example block diagram 500 for combining scan requests to generate a combined scan request 512 and corresponding scan parameters 510, according to an embodiment of the present disclosure. As illustrated, the block diagram 500 includes a BT host 502 and a BT controller 504. The BT host 502 may include a scan request processor that receives and analyzes various scan requests from multiple scan agents. The scan agents may be electronic devices utilizing BT communication (or other wireless communication technologies).

In some embodiments, the BT host 502 and/or the BT controller 504 may be disposed in the host processor 52 discussed with respect to FIG. 7. In other embodiments, the BT host 502 and/or BT controller 504 may be disposed in one or more of the cores 54, 56, 58 discussed with respect to FIG. 7. While the embodiments discussed with respect to FIG. 16 are related to BT technology, it should be understood that these embodiments may also be used with other wireless communication technologies.

The scan request processor 506 may receive multiple scan requests 508 from multiple scan agents. The scan request processor 506 may include the receiving core 54, the main core 56, the auxiliary core 58, and/or the processor 12. The scan agents may correspond to applications executing on the electronic device 10, such as communication applications, device pairing agents, location determining agents, and so on. For example, scan agent A may request a location of the electronic device 10 while scan agent B may request pairing the electronic device 10 to an external device, such as a wearable device.

The scan request processor 506 may identify one or more scan parameters for each scan request 508 from a scan agent. For example, for a given scan request 508, the scan request processor 506 may identify a corresponding duty cycle, a scan type, a scan priority, a range requirement, and the like. In some embodiments, one or more of the scan parameters may be specified in the scan request 508.

The duty cycle may refer to a scanning duty cycle for the requested scan and may be represented as a level (e.g., high, medium, or low) or a percentage for the scan using the eLNA with the main core 56 (e.g., 10%, representing, for example, 30 millisecond scan with eLNA on over a 300 millisecond scan interval).

The scan type may be specified as active or passive. The scan priority may indicate an aggressiveness of the scan to be performed which may be performed at the expense of additional power consumption. For example, a priority of "very critical" may improve the performance of the scan (e.g., accuracy or range) but may lead to increased power consumption in executing the scan. Other priority levels may include critical, normal, low, and the like. The range requirement may indicate a capability of the scan to receive detect signals at a certain distance (e.g., 5 feet to 100 yards, 10 feet to 100 feet, 20 feet to 30 feet) and may be related to a sensitivity of the receiver (e.g., the core performing the scan). The range requirement parameter may be a binary input (e.g., high or low, yes or no).

One or more scan requests 508 may be received from multiple scan agents simultaneously or consecutively by the scan request processor 506, and provide inputs to a scan parameter computation logic 509. The scan parameter computation logic 509 may include the processor 12. In some embodiments, the scan parameter computation logic 509 may be dual-core, for example, including the receiving core 54 and the main core 56. In other embodiments, the scan parameter computation logic 509 may additionally or alternatively include the auxiliary core 58. If more than one scan request 508 is received simultaneously, the scan request processor 506 may combine the scan requests 508 to improve a performance of the scan operation. For example, a combined scan request 512 may decrease a number of scan parameters 510 to be determined by the scan parameter computation logic 509. The scan parameter computation logic 509 may generate one or more scan parameters 510 based on the combined scan request 512 and provide the scan parameters 510 to a scan controller 504 (e.g., a BT controller) which executes a scan operation based on the scan parameters 510. In this way, the combined scan request 512 and the computed scan parameters 510 may decrease a time and reduce power consumption to execute the scan operation rather than performing each scan request 508 individually.

The scan request processor 506 may combine the scan requests 508, such that the scan parameters of the combined scan request 512 satisfy both original scan requests 508. That is, for each parameter of the original requests 508, the combined scan request 512 (e.g., the input of the scan parameter computation logic 509) may include the more stringent value. For example, a first scan request 508 may indicate a high duty cycle, a passive scan type, a priority of very critical, and a positive range requirement (e.g., able to detect a signal within a certain range). A second scan request 508 may indicate a medium duty cycle, an active scan type, a normal priority and a negative range requirement (e.g., not able to detect a signal within a certain range). In that case, the parameters of the combined scan request 512 may indicate a high duty cycle, an active scan type, a priority of very critical, and a positive range requirement. The combined scan request 512 and an indication of the scan agents from which the original scan requests 508 were received are provided to the scan controller 504.

In some embodiments, the scan parameter computation logic 509 receives the combined scan request 512 and generates one or more scan parameters 510 for a scan operation. That is, the one or more scan parameters 510 are the output of the scan parameter computation logic 509. The scan parameters 510 may be generated based on the parameters of the combined scan request 512 from the scan request processor 506. For example, a scan window for the combined scan request 512 during which the eLNA is on and/or off, based on the duty cycle include in the scan requests 508. For example, if a scan request 508 specifies a duty cycle of 10% with the eLNA on, the scan parameter computation logic 509 may determine a value representing 10% of the total scan window for the combined scan request (e.g., 8 milliseconds for a total scan window of 80 milliseconds). In that case, the duty cycle of the combined scan request 512 may include two values, a first value representing a scan window during which the eLNA is on and a second value representing a scan window during which the eLNA is off or bypassed.

Advantageously, the parameters of the combined scan request 512 are computed to increase or maximize an efficiency of executing the combined request. That is, the parameters of the combined scan request 512 can be adjusted or optimized based on a particular scan core (e.g., the receiving core 54 and/or the main core 56) which is executing the combined request. Further, the combined scan request 512 can be used with hardware that does not support scanning with more than one scan core because the combined request is executed as a single scan request.

In some embodiments, additional parameters may be included in the combined scan request 512. The additional parameters may include a level of existing scan traffic on a particular core, a duration of the scan interval, durations of portions of the scan interval (e.g., a duration of the scan interval with the eLNA on), and the like. The level of existing traffic on a particular core may include active streaming connections (e.g., audio or video), existing connections of the particular core with short connection intervals (e.g., temporary connections), and the like. The additional parameters may further improve an efficiency of executing the combined scan request 512. For example, if there is existing traffic on the main core 56, the low-power receiving core 54 may be used to execute at least a portion of the combined scan request 512.

The scan parameters 510 generated by the scan parameter computation logic 509 may be used by the BT controller 504 to configure the scan operation. The scan parameters 510 may include, for example, a scan type (e.g., active or passive), a scan interval or window, a scan window for the main core 56 and/or the receiving core 54 during which the eLNA is bypassed, a scan window for the main core 56 and/or the receiving core 54 during which the eLNA is on, a particular core 54, 56 or combination of the cores 54, 56 to be used for the scan operation, and the like. The scan parameters 510 may improve a scanning performance (e.g., a range and/or a sensitivity of the received signal) even though power consumption of the scanning operation may be increased. That is, the scan parameters 510 may enable a larger number of signals to be received and identified by the scanning operation.

In some embodiments, the scan operation based on the scan parameters 510 may be a BT connection scan. In that case, the scan operation may be an active scan during which a BT signal may be transmitted by the main core 56. The main core 56 or the receiving core 54 may scan (e.g., listen) for a response from a device in proximity to the electronic device 10. That is, the scan operation may be used to discover other devices within a range of the electronic device 10. For a connection scan, the scan parameters 510 generated by the scan parameter computation logic 509 may include, for example, a scan window for the main core 56 and/or the receiving core 54 during which the eLNA is bypassed, a scan window for the main core 56 and/or the receiving core 54 during which the eLNA is on, a scan interval, and the like.

In some embodiments, the scan operation based on the scan parameters 510 may be a BT page scan. In some embodiments, the electronic device 10 may transmit a BT signal to page an unconnected device via one or more channels used by the unconnected device. In other embodiments, the electronic device 10 may scan for a BT page signal from another device using the main core 56 and/or the receiving core 54. For a page scan, the scan parameters 510 generated by the scan parameter computation logic 509 may include, for example, a scan window for the main core 56 and/or the receiving core 54 during which the eLNA is bypassed, a scan window for the main core 56 and/or the receiving core 54 during which the eLNA is on, a scan interval, an indication of whether the scan by the main core 56 and/or the receiving core 54 is interlaced, and the like.

Figure 17:
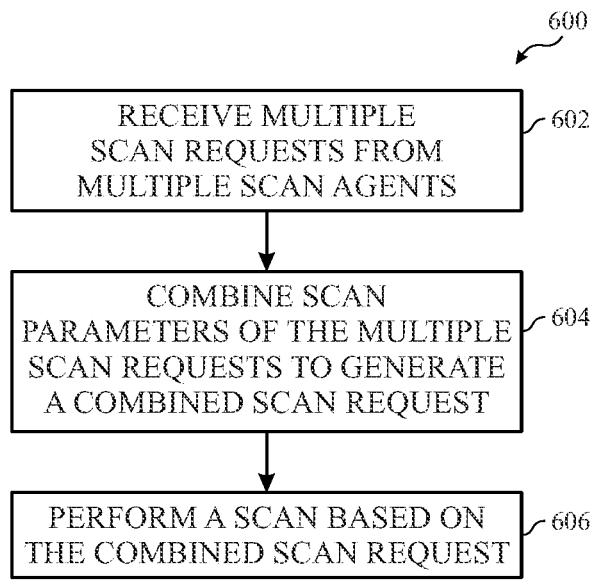
FIG. 17 is a flowchart illustrating for combining scan requests, according to an embodiment of the present disclosure.

FIG. 17 is a flowchart 600 illustrating example operations for combining scan requests to generate the combined scan request 512, according to an embodiment of the present disclosure. The example operations of the flowchart 600 may be performed by one or more components of the electronic device 10 of FIG. 1, including, for example, the processor 12, the main core 28, the auxiliary core 30, and/or the receiving core 34. Moreover, the flowchart 600 is merely an example of the operations that may be performed, and at least some operations of the flowchart 600 may be performed in a different order or skipped altogether.

The flowchart 600 begins at operation 602, where multiple scan requests 508 may be received by the scan request processor 506. The scan request processor 506 may provide indications of the multiple scan requests 508 as inputs to the scan parameter computation logic 509. At operation 604, the scan request processor 506 combines scan parameters of the multiple scan requests to generate a combined scan request. That is, the scan parameters of the multiple scan requests are combined such that the scan parameters of the combined scan request 512 satisfy the original, received scan requests.

For each parameter of the original requests, the combined scan request 512 may include the more stringent value. For example, a first scan request 508 may indicate a high duty cycle, a passive scan type, a priority of very critical and a positive range requirement (e.g., able to detect a signal within a certain range). A second scan request 508 may indicate a medium duty cycle, an active scan type, a normal priority and a negative range requirement (e.g., not able to detect a signal within a certain range). In that case, the parameters of the combined scan request 512 may indicate a high duty cycle, an active scan type, a priority of very critical, and a positive range requirement. At operation 606, the scan parameter computation logic 509 may generate scan parameters 510 based on the combined scan request 512 and the processor 12 may instruct a BT controller 504 to perform (e.g., execute) the a scan operation based on the scan parameters 510.

Figure 18:
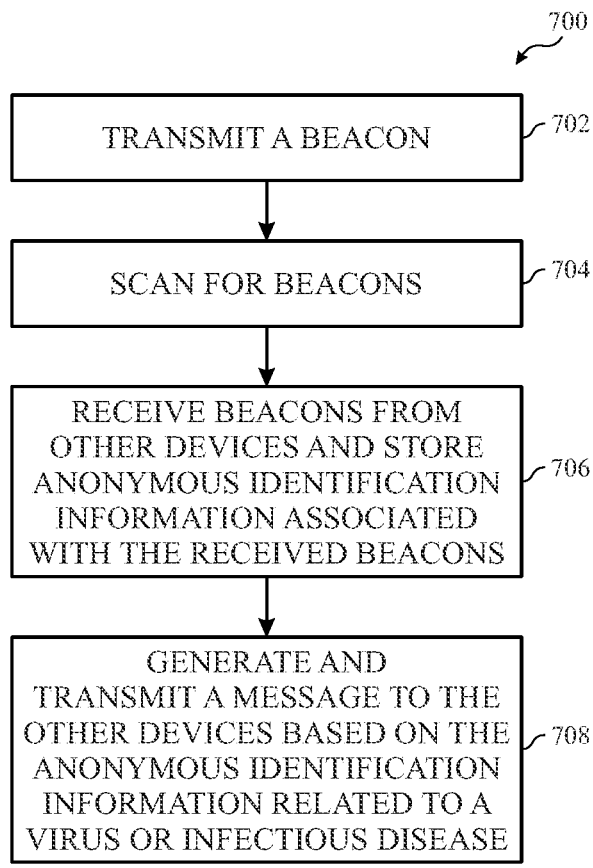
FIG. 18 is a flowchart for performing contact tracing by using the receiving core to scan for beacons, according to an embodiment of the present disclosure.

FIG. 18 is a flowchart 700 for performing contact tracing using the receiving core 54 to scan for beacons, according to an embodiment of the present disclosure. The example operations of the flowchart 700 may be performed by one or more components of the electronic device 10 of FIG. 1, including, for example, the processor 12, the main core 28, the auxiliary core 30, and/or the receiving core 34. Moreover, the flowchart 700 is merely an example of the operations that may be performed, and at least some operations of the flowchart 700 may be performed in a different order or skipped altogether.

The flowchart 700 begins at operation 702 where the processor 12 of the electronic device 10 instructs a core, such as the main core 56, to transmit a beacon. The beacon may be an anonymous BT signal transmitted to any other electronic devices near or in close proximity to the electronic device 10 (e.g., within range of receiving the beacon). In some embodiments, the beacon includes anonymous information identifying the electronic device 10 without compromising privacy of the user of the electronic device 10. For example, the beacon may include a Universally Unique Identifier (UUID) that uniquely identifies the other electronic device, but may not include user-identifying information (e.g., name, contact information, or other information unique to the user). In some embodiments, the beacon includes a signal used to identify other electronic devices (e.g., the signal may request a response identifying the other electronic devices), and the anonymous information may be sent in a separate and/or subsequent transmission.

At operation 704, the processor 12 instructs a core, such as the receiving core 54, to scan for beacons transmitted from other electronic devices that are near or in close proximity to the electronic device 10. In some embodiments, the processor 12 may instruct a different core, such as the main core 56 or the auxiliary core 58 to scan for the beacons at operation 704. However, utilizing the receiving core 54 to scan for the beacons may consume less power than the other cores, and thus, may prolong battery life of the electronic device 10. Additionally or alternatively, utilizing the receiving core 54 may enable more frequent and/or longer scanning than using another core (e.g., the main core 56).

At operation 706, the receiving core 54 receives a beacon from one or more other electronic devices. The processor 12 instructs the receiving core 54 to store anonymous identification information associated with the received beacons. As discussed above, the anonymous information may be included in the beacon or may be received in a separate transmission from the one or more other electronic devices. The anonymous information may include data which identifies the one or more other electronic devices without indicating or compromising an identity of a user of the other electronic devices. The anonymous information may be stored in a log on the electronic device 10 for later use as discussed with respect to operation 708.

At operation 708, the processor 12 may instruct the main core 56 to generate and transmit a message to the other electronic devices based on the anonymous information. The message may be related to a virus or infectious disease. For example, if a user of the electronic device 10 is diagnosed as infected with a virus or infectious disease, health officials may utilize the stored log to identify and notify users of the other electronic devices that have been near or in close proximity to the electronic device 10 within a particular period of time (e.g., approximately 14 days), while the anonymous nature of the data stored ensures and maintains privacy of the users.

Advantageously, the combined scan request improves an efficiency of performing the scanning operation by executing a single scan request rather than the original multiple scan requests individually. Further, execution of the combined scan request may reduce power consumption compared to executing the original scan requests individually. Use of the receiving core 54 may further improve an efficiency and reduce power consumption of the combined scan request by enabling the original scan requests to be received while the main core 56 is executing another scan request or if there is existing traffic on the main core 56.

As will be appreciated, a balance between reduced power consumption and duration of the scanning operation may be adjusted depending on power constraints of the electronic device and a time period within which a scanning operation takes place. That is, the utilization of the main core and receiving core may be adjusted, manually or dynamically, based on constraints of the scanning operation being performed.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An electronic device, comprising:
a receiving core configured to receive a first set of wireless signals via a wireless local area network;
a main core configured to receive a second set of wireless signals and transmit data via the wireless local area network; and
processing circuitry coupled to the receiving core and the main core, the processing circuitry configured to:
activate the receiving core to scan for the first set of wireless signals on the wireless local area network;
activate the main core to receive the second set of wireless signals via the wireless local area network and deactivate the receiving core in response to the receiving core receiving the first set of wireless signals, scanning for a third set of wireless signals on the wireless local area network using the main core during an inactivity period; and
deactivate the main core and reactivate the receiving core in response to the main core not receiving the third set of wireless signals during the inactivity period.

2. The electronic device of claim 1, wherein the wireless local area network comprises a Wi-Fi network.

3. The electronic device of claim 1, wherein the receiving core uses 40-50 milliwatts to scan for the first set of wireless signals and the main core uses 60-70 milliwatts to scan for the third set of wireless signals.

4. The electronic device of claim 1, wherein the receiving core uses 8-33 milliwatts to scan for the first set of wireless signals and the main core uses 27-52 milliwatts to scan for the third set of wireless signals.

5. The electronic device of claim 1, wherein the receiving core is not configured to transmit signals.

6. The electronic device of claim 1, wherein the inactivity period is approximately 2-10 seconds.

7. The electronic device of claim 1, wherein the processing circuitry is configured to activate the main core while activating the receiving core.

8. The electronic device of claim 1, wherein the processing circuitry is configured to determine a degree of congestion on a first channel using the receiving core while receiving the second set of wireless signals on a second channel using the main core.

9. The electronic device of claim 1, wherein the wireless local area network is configured to operate at a frequency within approximately 2.4-2.4835 gigahertz.

10. An electronic device, comprising:
   a receiving core configured to scan for a first signal, wherein the first signal comprises a Bluetooth signal or a Wi-Fi signal, and wherein the receiving core is configured to only receive signals;
   a main core configured to scan for a second signal, the main core configured to transmit and receive signals;
   a first radio frequency front end coupled to the receiving core;
   a second radio frequency front end coupled to the main core;
   one or more antennas coupled to the first radio frequency front end and the second radio frequency front end; and
   one or more processors coupled to the receiving core and the main core, the one or more processors configured to:
      receive the first signal via the one or more antennas, the first radio frequency front end, and the receiving core; and
      receive the second signal via the one or more antennas, the second radio frequency front end, and the main core.

11. The electronic device of claim 10, wherein the receiving core is configured to scan for the first signal using 8-40 milliwatts per scan and the main core is configured to scan for the second signal using 27-60 milliwatts per scan.

12. The electronic device of claim 10, wherein the one or more processors are configured to transmit data via the main core.

13. The electronic device of claim 10, wherein the receiving core is configured to consume fifty percent less power when scanning for the first signal than the main core when scanning for the second signal.

14. The electronic device of claim 10, wherein a bandwidth of the receiving core is approximately 1 megahertz.

15. The electronic device of claim 10, wherein the first radio frequency front end comprises a first low noise amplifier and the second radio frequency front end comprises a second low noise amplifier.

16. A method comprising:
   receiving a first scan request to scan for a first signal, the first scan request having a first scan type;
   receiving a second scan request to scan for a second signal, the second scan request having a second scan type;
   generating scan parameters for a scan operation based on the first scan request and the second scan request, the scan parameters comprising a third scan type;
   in response to determining that the third scan type comprises a passive scan, performing the scan operation using a receiving core of an electronic device; and
   in response to determining that the third scan type comprises an active scan type, performing the scan operation using the receiving core and a main core of the electronic device.

17. The method of claim 16, wherein generating the scan parameters comprises satisfying the first scan request and the second scan request.

18. The method of claim 16, wherein the scan parameters include at least one of a duty cycle, a scan priority, or a range requirement.

19. The method of claim 16, wherein the scan parameters are at least based in part on the first scan type and the second scan type.

20. The method of claim 16, wherein the receiving core consumes fifty percent less power than the main core.

* * * * *